United States Patent
Hayes et al.

(10) Patent No.: US 8,595,946 B2
(45) Date of Patent: *Dec. 3, 2013

(54) TWO DIMENSION LAYOUT AND POINT TRANSFER SYSTEM

(71) Applicant: Trimble Navigation Limited, Sunnyvale, CA (US)

(72) Inventors: James N. Hayes, Urbana, OH (US); Chris W. Snyder, Union City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/627,573

(22) Filed: Sep. 26, 2012

(65) Prior Publication Data

US 2013/0019486 A1  Jan. 24, 2013

Related U.S. Application Data

(63) Continuation of application No. 13/287,028, filed on Nov. 1, 2011, now Pat. No. 8,281,495, and a continuation of application No. 12/824,716, filed on Jun. 28, 2010, now Pat. No. 8,087,176.

(51) Int. Cl.
G01C 15/02 (2006.01)
G01B 11/27 (2006.01)

(52) U.S. Cl.
USPC .................................. 33/280; 33/1 G; 33/286

(58) Field of Classification Search
USPC ........... 33/280, 1 G, 286, 276, 278, 290, 291, 33/1 CC
See application file for complete search history.

(56) References Cited

U.S. PATENT DOCUMENTS

| | | |
|---|---|---|
| 4,035,084 A | 7/1977 | Ramsay .................... 356/139.08 |
| 4,598,481 A | 7/1986 | Donahue |
| 4,820,041 A | 4/1989 | Davidson |
| 4,836,671 A | 6/1989 | Bautista |
| 5,076,690 A | 12/1991 | deVos |
| 5,100,202 A | 3/1992 | Hughes |
| 5,100,229 A | 3/1992 | Lundberg |
| 5,137,354 A | 8/1992 | deVos |
| 5,243,398 A | 9/1993 | Nielsen ......................... 356/138 |
| 5,294,970 A | 3/1994 | Dornbusch |
| 5,539,990 A | 7/1996 | Le .................................... 33/283 |
| 5,579,102 A | 11/1996 | Pratt |
| 5,588,216 A | 12/1996 | Rank et al. ...................... 33/286 |
| 5,598,269 A | 1/1997 | Kitaevich |
| 5,864,956 A | 2/1999 | Dong .............................. 33/227 |

(Continued)

*Primary Examiner* — Christopher Fulton
(74) *Attorney, Agent, or Firm* — Frederick H. Gribbell; Aaron S. Brodsky

(57) ABSTRACT

A two-dimension layout system identifies points and their coordinates, and transfers identified points on a solid surface to other surfaces in a vertical direction. Two leveling laser light transmitters are used with a remote unit to control certain functions. The laser transmitters rotate about the azimuth, and emit vertical (plumb) laser planes. After being set up using benchmark points, the projected lines of the laser planes will intersect on the floor of a jobsite at any point of interest in a virtual floor plan, under control of a user with the remote unit. The laser light planes also project lines that will intersect along the ceiling at a point that is truly plumb above the crossing point on the floor. The laser planes also provide an "implied" plumb line that is projected in space, which is visible along a solid vertical surface between the intersecting floor and ceiling points.

20 Claims, 16 Drawing Sheets

Setting Studded Wall

(56) References Cited

U.S. PATENT DOCUMENTS

| | | |
|---|---|---|
| 5,983,510 A | 11/1999 | Wu et al. .......................... 33/227 |
| 6,035,540 A | 3/2000 | Wu et al. .......................... 33/286 |
| 6,140,957 A | 10/2000 | Wilson |
| 6,501,543 B2 | 12/2002 | Hedges |
| 6,545,751 B2 | 4/2003 | Beliveau |
| 6,763,595 B1 | 7/2004 | Hersey .......................... 33/286 |
| 7,110,092 B2 | 9/2006 | Kasper |
| 7,679,727 B2 | 3/2010 | Benz et al. .................... 356/4.01 |
| 8,087,176 B1* | 1/2012 | Hayes et al. .................... 33/280 |
| 8,281,495 B2* | 10/2012 | Hayes et al. .................... 33/280 |
| 2004/0177523 A1 | 9/2004 | Chang et al. .................... 33/281 |
| 2006/0179672 A1 | 8/2006 | Tacklind .......................... 33/286 |
| 2006/0280212 A1 | 12/2006 | Lu et al. ...................... 372/38.02 |

* cited by examiner

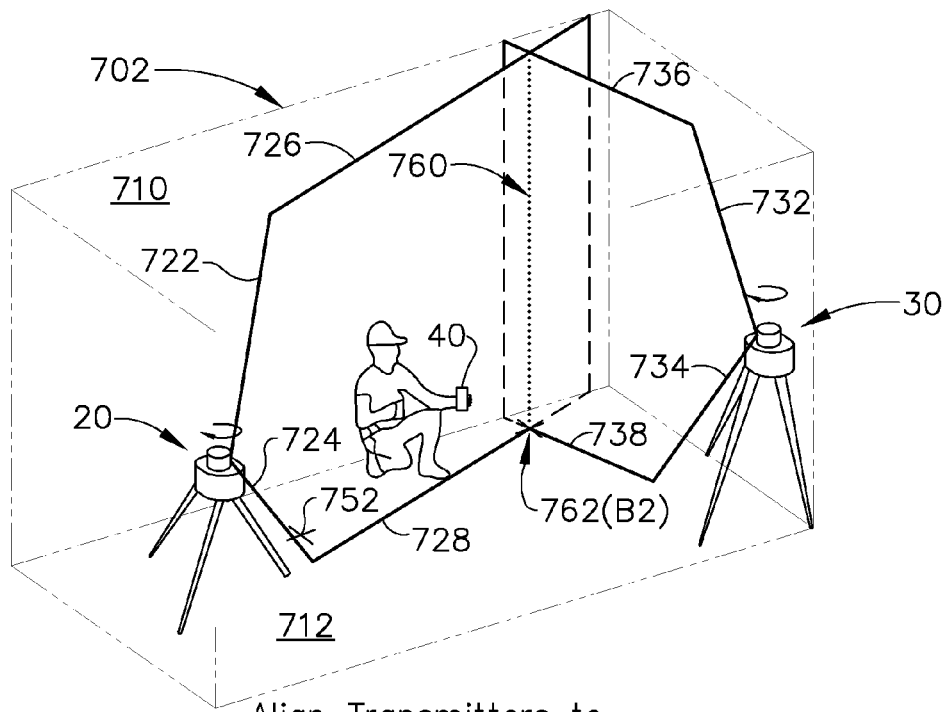
FIG. 11  Align Transmitters to Benchmark 2
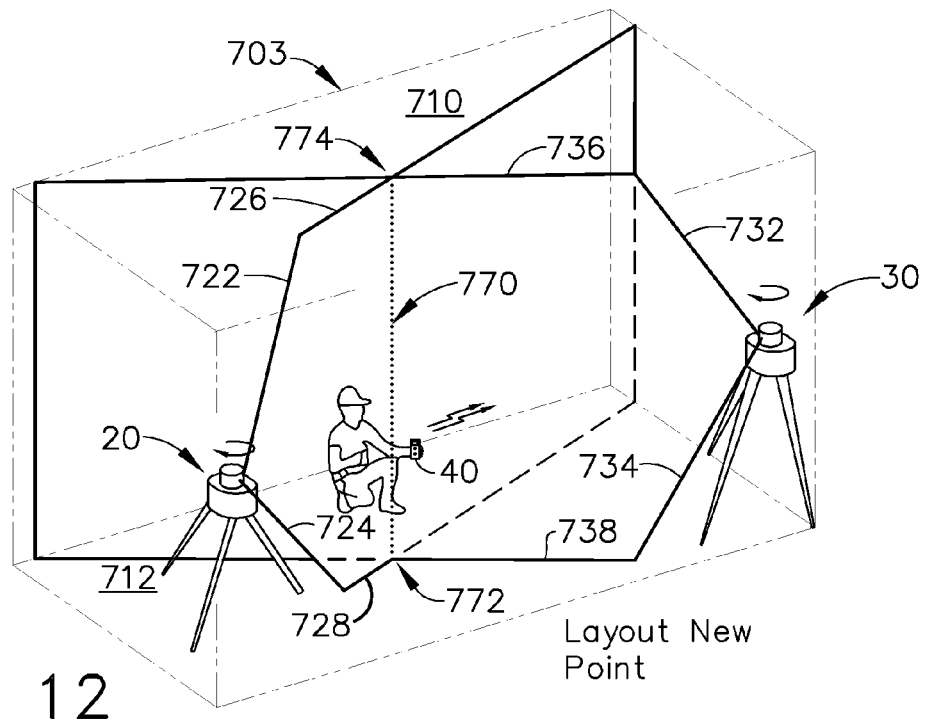
FIG. 12  Layout New Point

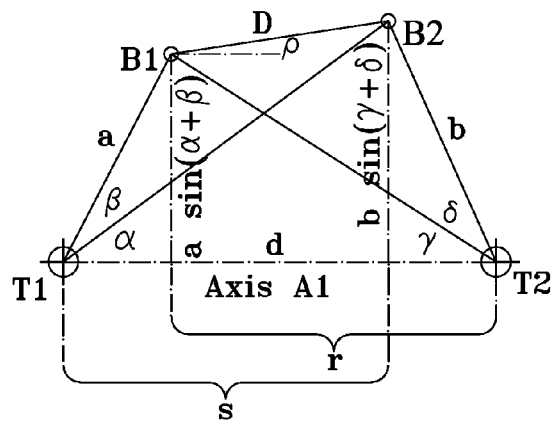
FIG. 22  Set Up Diagram
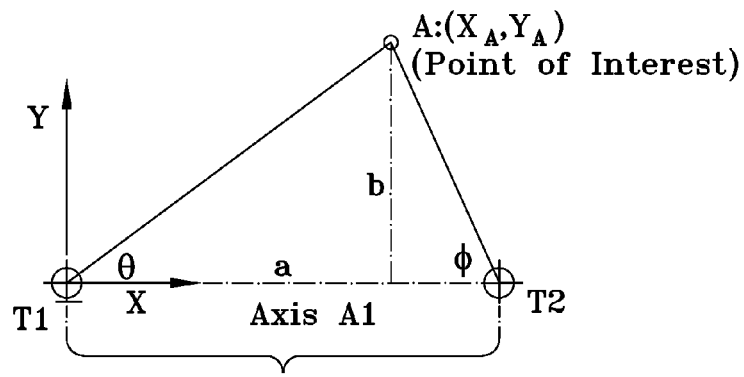
FIG. 23  Locate Point of Interest Diagram
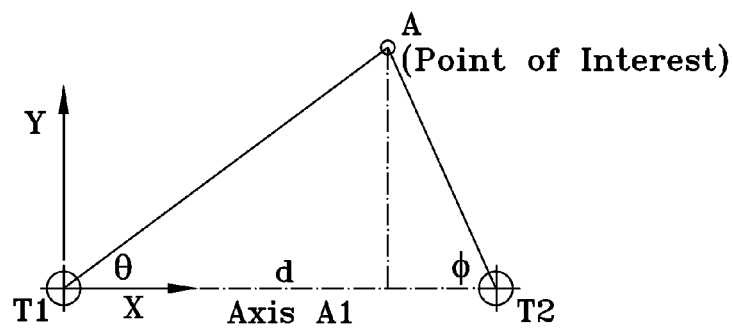
Survey Diagram
FIG. 24

TWO DIMENSION LAYOUT AND POINT TRANSFER SYSTEM

CROSS-REFERENCE TO RELATED APPLICATIONS

The present application is a continuation of application Ser. No. 13/287,028, titled "TWO DIMENSION LAYOUT AND POINT TRANSFER SYSTEM," filed on Nov. 1, 2011, now U.S. Pat. No. 8,281,495, which is a continuation of application Ser. No. 12/824,716, titled "TWO DIMENSION LAYOUT AND POINT TRANSFER SYSTEM," filed on Jun. 28, 2010, now U.S. Pat. No. 8,087,176.

TECHNICAL FIELD

The technology disclosed herein relates generally to layout "surveying" equipment and is particularly directed to a two-dimension layout system of the type which identifies points and their coordinates, and transfers identified points on a surface to other surfaces in a vertical direction. Embodiments are specifically disclosed using two laser light transmitters with a remote unit to control certain functions. The laser transmitters may be identical. Preferably the laser transmitters include a self-leveling capability, and exhibit a rotation about the azimuth, and a vertical (plumb) laser plane (or rotating line) output. When the system is set up it is capable of aiming (by rotation) each of the vertical (laser light) plane outputs from the transmitters (which are positioned at some distance apart), so that the projected lines (of the laser light planes) will cross on the surface at any given desired point on the jobsite. In addition, the extent (divergence) of the projected laser light planes are such that they also cross overhead on the ceiling, which crossing point occurs at a location that is truly plumb above the corresponding crossing point on the surface. A further feature of the system provides an "implied" plumb line that is projected in space, and is represented by the intersection of the two planes between the point intersections on the surface and the ceiling. This implied plumb line is visible if a solid surface (or perhaps smoke) is placed in the volumetric space where the plumb line is projected. The system includes a methodology for simplified layout and direct point transfer to the ceiling.

STATEMENT REGARDING FEDERALLY SPONSORED RESEARCH OR DEVELOPMENT

None.

BACKGROUND

The present invention relates generally to a laser system that provides the elements for visually locating points of interest on a two-dimensional horizontal surface for to use in primarily interior construction environments. A simple, accurate and cost effective system for the layout of floor plans at the jobsite has long been in need. Conventional GPS is not usable inside standard steel construction buildings. Previous laser based systems have been overly complex and expensive, missing the mark in almost every area required for this market.

In prior art laser based positioning systems, such as disclosed in U.S. Pat. No. 5,100,229, three or more laser transmitters (beacons) are placed around the perimeter of a work site. Each transmitter emits a plane of light approximately 45 degrees to vertical while continuously rotating at a constant speed. The beams from each transmitter must each have their own unique and highly controlled speed of rotation, or alternatively their own unique modulation frequency, so they may be distinguished from each other. A strobe on each provides a reference signal to start a series of timing events that are ultimately utilized to triangulate position. The system can be used for two-dimensional or three-dimensional applications. The complexity of this method is very high, and the requirement of having constant rotational laser scanning is critical. In addition, it is computationally intensive, especially when setting up the system.

Another prior apparatus, such as disclosed in U.S. Pat. No. 5,076,690, uses a rotating laser beam to scan retro-reflective bar coded targets placed around the perimeter of the job site. The portable transmitter/receiver utilizes optical collection optics to receive the retro-reflected energy from at least three of the targets. A rotational encoder assumes a relatively constant rotation speed and interpolates between each perimeter slot of the encoder disk a precision azimuth angle for each acquired target. After a set-up procedure that uses at least two known benchmarks, the working field is 'scaled' so that any other point of interest can be found with a two-dimensional working plane. A complex method to precision calibrate and characterize each leading edge of each rotary encoder slot is required to provide the level of precision sought in the construction layout application. Job site obstructions also become a challenge when acquiring sufficient targets in the right place, with respect to the position of the transmitter, to provide a strong calculation of position.

Still another method of laser based positioning is disclosed in U.S. Pat. No. 7,110,092. Two parallel laser beams are emitted at a known distance from each other. The beams are rotated together at a constant speed, thus defining the working plane. A laser receiver is used to determine when each beam becomes incident on the sensing element. Because the rotation of the beams is assumed to be constant, the timing of the two beams incident on the receiver becomes faster at greater distances and thus is a smaller percentage of the time it takes to traverse the entire perimeter. Distance is extrapolated from this information. Further, if an index is provided to indicate the start of rotation of the laser beams, then position can be found. Constant rotation speed is again very critical, and the position calculation for this method typically has not been sufficient accuracy for what is required for typical construction jobsite layout.

Still other laser based methods have been used to provide the construction layout function. Several of them, such as those manufactured and marketed by SL Laser and Flexijet, utilize a pointing laser beam that is mounted on a rotating base that can provide azimuth angle and a frame with a rotatable sextant that can provide altitude angle. In this manner a laser beam can be pointed in the direction of a desired point of interest and projected onto a surface. The indicated point location is accurate only if the surface onto which it is projected is both flat and at the theoretically expected elevation. Otherwise serious errors can occur, and become increasingly large as the incident projection angle onto the surface becomes steeper.

It is seen that there remains a need for a more effective positioning system for use in the construction industry and, more specifically, for floor layout indoors. This need encompasses the desire for more simplicity so that its concept of operation and method of use is much more intuitive to the user. Set up of the system should be straightforward and fast. In addition, there is a need to provide a visual system for interior use. Doing so will add to the intuitive nature of the system as well as reduce the overall expense of the system, because the function of automatically detecting an encoded or modulated laser signal is not required. Lastly, there is a need to provide a system where the projection onto a surface is not subject to flatness errors of the incident surface.

SUMMARY

Accordingly, it is an advantage to provide a floor layout system that includes two base units that can have an alignment axis established therebetween, and a remote unit that communicates with both of the base units, in which the system is configured to provide a to visual presentation of virtual points on a jobsite physical surface that have predetermined coordinates, relative to locations of at least two benchmark points.

It is another advantage to provide a base unit that has a laser transmitter having an optical emission that creates a vertical laser light plane, a laser receiver with a null position-detecting capability, in which the receiver is mounted to detect laser light offsets in the horizontal direction, and a leveling mechanism.

It is yet another advantage to provide a remote unit that has a computer processing circuit and a memory circuit, along with a communication circuit that can communicate to at least one base unit of a floor layout system, in which the remote unit also has a display and a user controlled input device; the remote unit also is in communication with a virtual building plan, and its display is capable of depicting at least two benchmark points and at least one known virtual point that is to be visually indicated on a jobsite physical surface.

It is still another advantage to provide a method for setting up a floor layout system, in which the system includes two base units each having a laser transmitter, wherein a user will perform certain functions on a jobsite, including: (a) positioning the two base units on a jobsite floor, (b) aligning the two laser transmitters of both base units to create an alignment axis, (c) locating two benchmark points with intersecting laser light from the two laser transmitters, and (d) determining azimuth angles of the two laser transmitters for those benchmark points.

It is a further advantage to provide a method for using a floor layout system having "known" points of a building plan, in which the system includes two base units each with a laser transmitter, and including a remote unit that is communication with the base units; wherein a user performs certain functions, including: (a) positioning the two laser transmitters of the base units on a jobsite floor to establish an alignment axis therebetween, (b) providing a virtual jobsite floor plan, (c) determining coordinates of two benchmark points of the virtual floor plan and determining azimuth angles of the two laser transmitters corresponding to those benchmark points, (d) entering coordinates for a point of interest on the virtual floor plan, and slewing the two laser transmitters to those coordinates, and (e) to visually indicating the physical point of interest on the jobsite floor, by use the laser light lines produced by the laser transmitters.

It is yet a further advantage to provide a method for using a floor layout system to enter "unknown" points of a jobsite into a virtual floor plan, in which a system has two base units each with a laser transmitter, and a remote unit that is in communication with the base units; wherein a user performs certain functions, including: (a) positioning the two laser transmitters of the base units on a jobsite floor to establish an alignment axis therebetween, (b) providing a virtual jobsite floor plan, (c) determining coordinates of two benchmark points of the virtual floor plan and determining azimuth angles of the two laser transmitters corresponding to those benchmark points, (d) selecting an "unknown" physical point of interest on the jobsite floor, (e) slewing the two laser transmitters so that they create visible intersecting light lines at that physical point of interest, (f) entering the azimuth angles for the two laser transmitters to determine the corresponding coordinates of that point of interest on the remote unit, and (g) using reverse calculations, plotting that physical point of interest on the virtual floor plan of the remote unit.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a layout and point transfer system is provided, which comprises: (a) a first base unit, having a first laser light transmitter that emits a first laser light plane, and a first processing circuit; and (b) a second base unit, having a second laser light transmitter that emits a second laser light plane, and a second processing circuit; wherein: (c) the system is configured to register locations of the first and second base units on a physical jobsite surface with respect to at least two benchmark points that are also located on the physical jobsite surface; and (d) the system is configured to provide a visual representation of a virtual point on the physical jobsite surface, by aiming first laser light plane and the second laser light plane, to indicate a location of the virtual point.

In accordance with another aspect, a base unit for use in a floor layout and point transfer system is provided, which comprises: a first laser light transmitter that emits a substantially vertical plane of laser light, the first laser light transmitter being rotatable about to a substantially vertical axis; a laser light receiver having: a null-position photosensor that is mounted to detect laser light offsets in a substantially horizontal direction, and an amplifier circuit interfacing between the null-position photosensor and the laser light receiver; and a leveling mechanism.

In accordance with yet another aspect a method for setting up a layout and point transfer system is provided, in which the method comprises the following steps: (a) providing a first base unit which includes a first laser light transmitter that emits a first laser light plane; (b) providing a second base unit which includes a second laser light transmitter that emits a second laser light plane; (c) positioning the first base unit and the second base unit at two different locations on a solid surface of a jobsite; (d) determining an alignment axis between the first base unit and the second base unit; (e) aiming the first laser light transmitter and the second laser light transmitter so that a first benchmark point is indicated by intersecting laser light lines along the solid surface, which are produced by the first and second laser light planes; and determining a first set of azimuth angles of the first and second laser light transmitters; (f) aiming the first laser light transmitter and the second laser light transmitter so that a second benchmark point is indicated by intersecting laser light lines along the solid surface, which are produced by the first and second laser light planes; and determining a second set of azimuth angles of the first and second laser light transmitters; and (g) by use of the first and second sets of azimuth angles, determining positions of the first and second base units with respect to the first and second benchmark points.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with to the description and claims serve to explain the principles of the technology. In the drawings:

FIGS. 9-13 are diagrammatic views of how a human user would use the system of FIG. 1, first to align a pair of transmitter axes, then to align the transmitters to two different benchmark points, then to align the laser planes to a floor point, and finally to align the laser planes along a plumb line of a wall surface.

FIG. 22 is a diagram showing positions of physical points and angles involved in a set-up routine.

FIG. 23 is a diagram showing positions of physical points and angles involved in a routine for locating a known point of interest.

FIG. 24 is a diagram showing positions of physical points and angles involved in a routine for entering an unknown point of interest.

DETAILED DESCRIPTION

Figure 1:
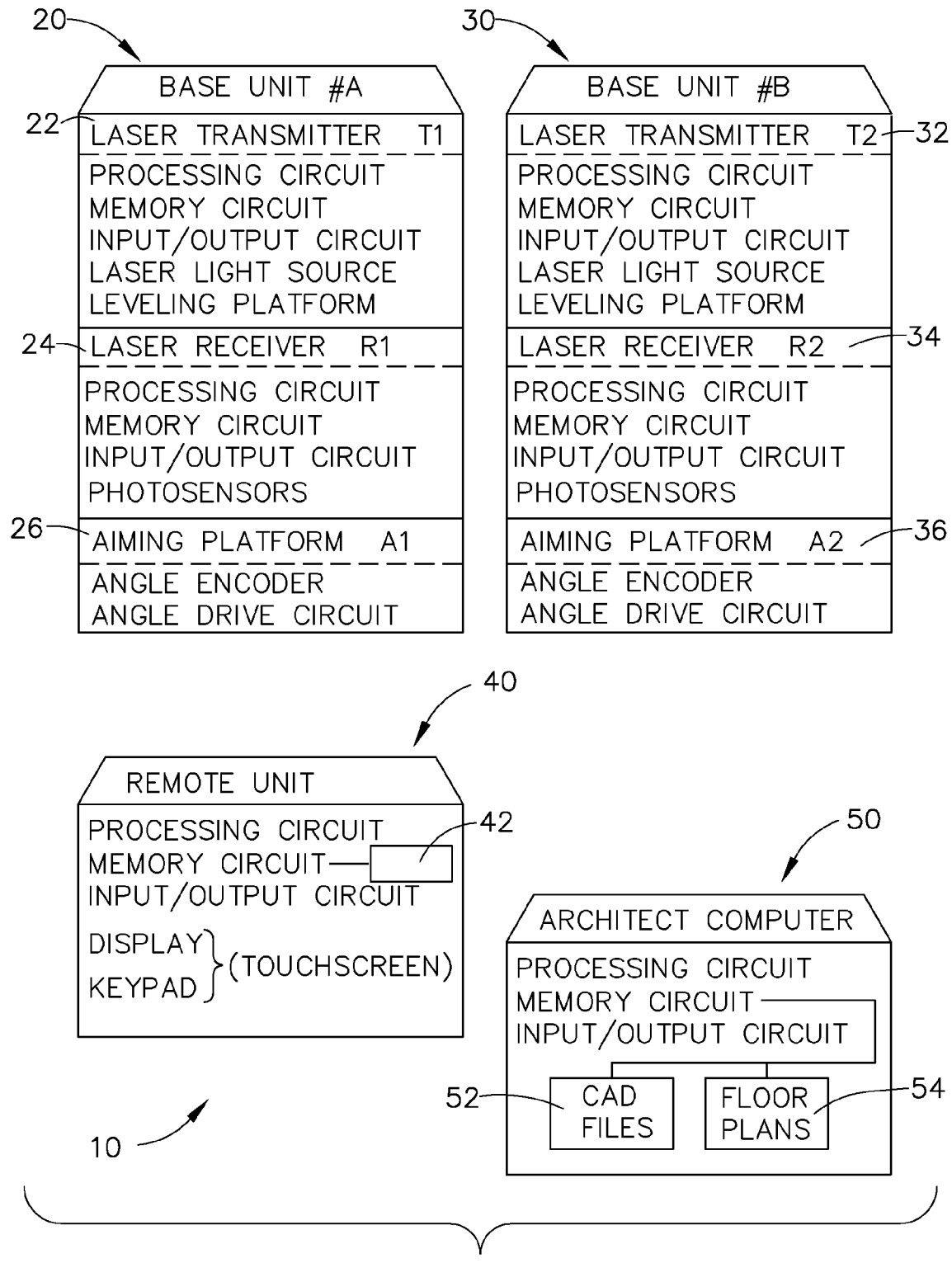
FIG. 1 is a block diagram of the major components of a layout and point transfer system, as constructed according the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments disclosed herein include to both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

System Set-Up; Introduction

Figure 9:
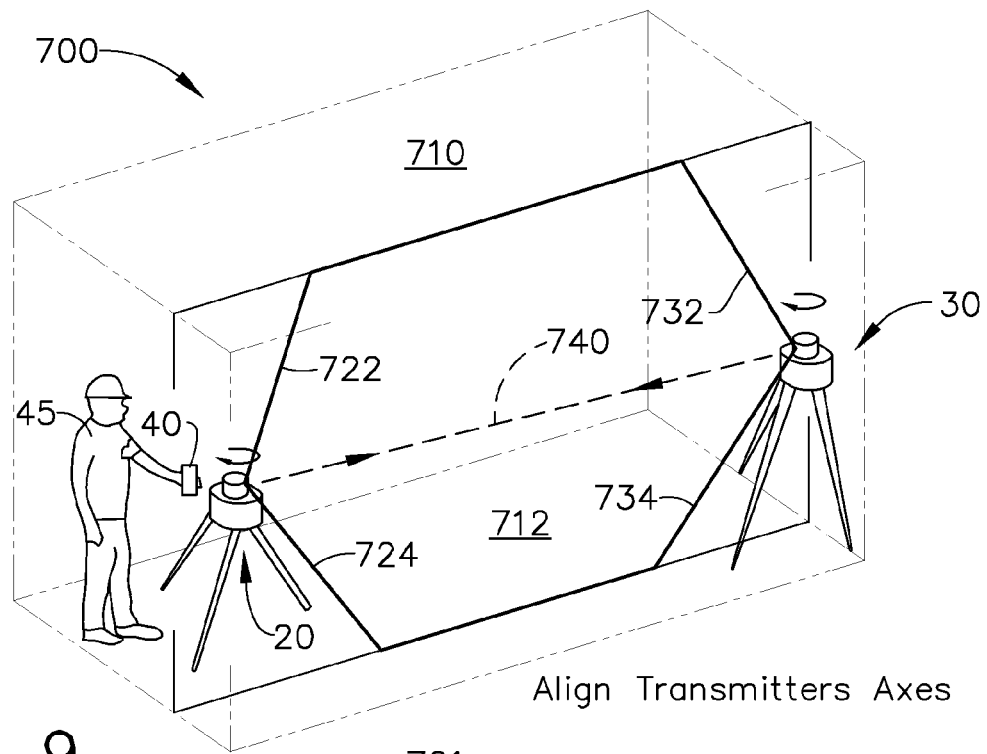
Figure 10:
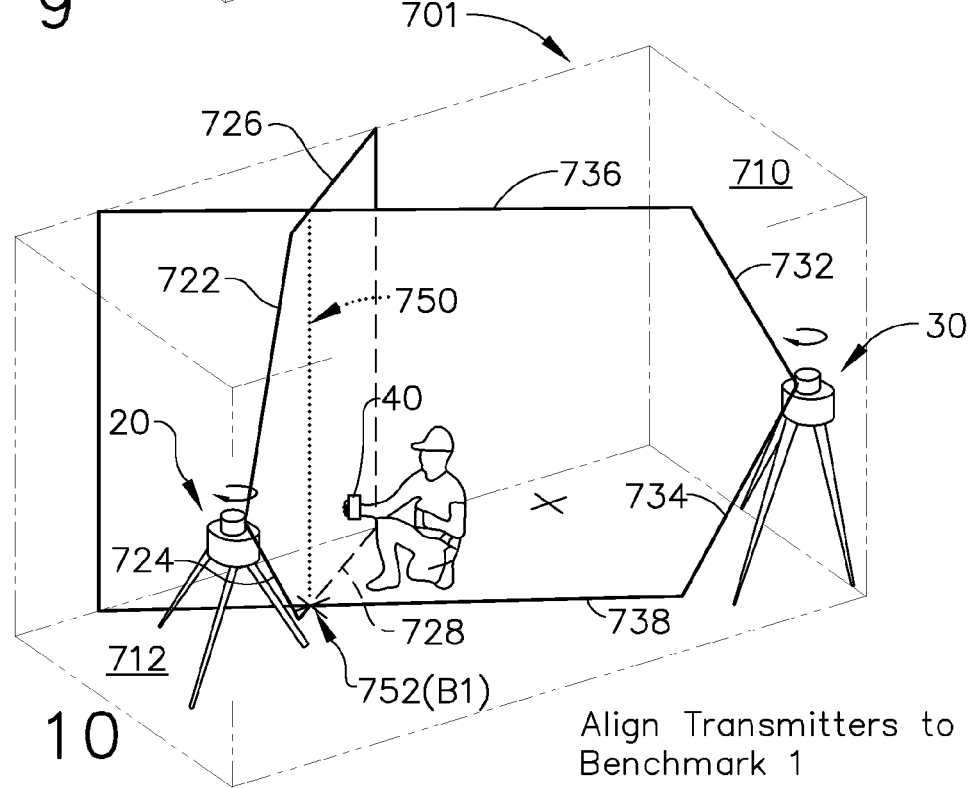

It is assumed that there exists at least two known points (also sometimes referred to as "benchmarks" herein) on the jobsite which can be utilized for the setting up the system. These benchmark points would have been established from previous survey efforts. FIGS. 9-11 illustrate a basic example of how the system can be set up. A first step (see FIG. 9) illustrates an alignment of the transmitters' output vertical planes to each other with the use of an RF (radio frequency) remote unit. This establishes an axis between the centerlines of each transmitter "base unit" device and indexes the angular encoders to that. This process can be performed by visually aligning the transmitter planes to each other, but may be facilitated with the addition of a split photocell on the transmitter base units that would guide to and lock into place the respective planes, adding convenience and precision to the process.

A second step (see FIG. 10) illustrates the establishment of the first known benchmark. The vertical planes from each transmitter base unit are commanded to position over the point of interest by the handheld radio remote unit, and then their coordinates are entered. The second known benchmark is entered in a similar manner, in a third step (as illustrated in FIG. 11). After this third step, the remote unit's computer system has sufficient set-up information to calculate the location and "find" any other point of interest within the working area. The above example steps will be discussed below, in greater detail.

Finding a "Known" Point; Introduction

FIG. 12 illustrates a basic configuration of laser transmitters and output laser plane configurations for a system that was previously set-up. The vertical laser light planes emitted by the base unit laser transmitters can be visible red laser light; however, other light wavelengths could be used instead, such as infrared, green, or other light wavelengths as well. For many of the applications using this system, it will be preferable for the laser light to be of a visible wavelength, and the description hereinbelow will assume that is the case.

The laser planes emanate from the two laser transmitters' rotors, which have capability of rotation about the vertical instrument axis. This allows each laser transmitter the ability to position its visible vertical plane at any angle about its rotation axis, and then to hold static at that position. The laser transmitters are located at a distance (not necessarily known) from each other; in this example, they are positioned near each corner of the room. As can be seen from FIG. 12, a first point is formed on the floor at the intersection of the two laser planes. In addition, a second point is formed on the ceiling, above the first point on the floor. If the two laser planes are truly vertical with respect to gravity, then the point on the ceiling is in a location that is plumbed over the point on the floor. Another interesting aspect is the formation of an implied plumb line where the two laser planes intersect.

When the system is set up on a jobsite, the laser planes can be commanded to rotate into position so that the intersection identifies any point of interest (on the floor or ceiling) that the user chooses. This is accomplished via the remote unit (using, for example, a radio link or an IR link) that communicates with the two base unit laser transmitters, thereby allowing the user mobility throughout the room and enabling him/her to be at the physical location where the layout work is being performed.

Figure 13:
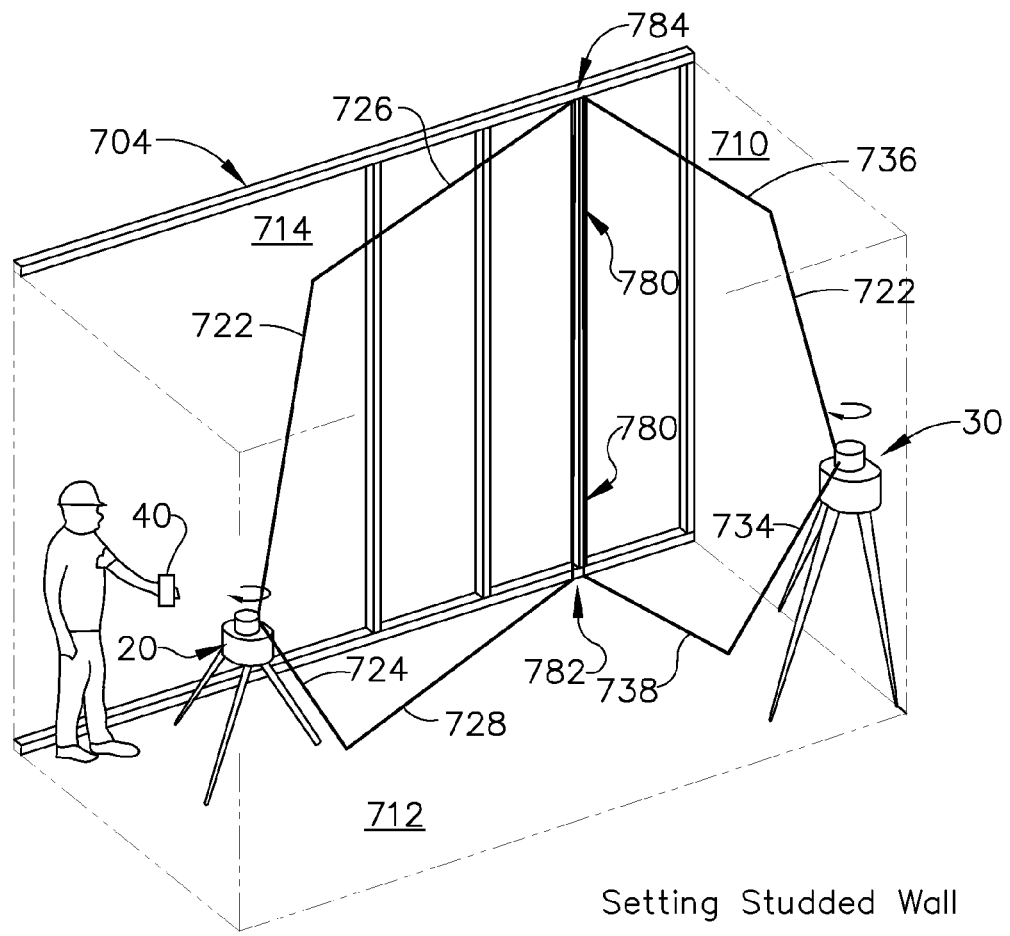

Once the set-up is completed the user may enter coordinates of interest into the handheld remote unit. When this occurs each vertical laser plane can be commanded to slew into position so that the visible intersection will reveal the physical location. Points of interest may also be downloaded from other support software so that the user can simply choose various points of interest from a listing. Floor layout can proceed accordingly. Because there exists a "second" intersection on the ceiling that is continuously plumbed over the "first" intersection on the floor, point transfer from floor to ceiling can proceed simultaneously. This is of use in laying out sprinkler systems and the like. In addition, there is a vertical implied plumb line at the intersection of the two vertical planes (i.e., between the two floor and ceiling intersection points). This vertical implied plumb line can be used to help align and set studded walls—an example of this methodology is illustrated in FIG. 13. These examples will be discussed below, in greater detail.

Details of System Hardware

Referring now to FIG. 1, an entire layout and point transfer system, generally designated by the reference numeral 10, is depicted in block diagram form. A first base unit is generally designated by the reference numeral 20, and is also referred to on FIG. 1 as "BASE UNIT #A." A second base unit is generally designated by the reference numeral 30, and is also referred to on FIG. 1 as "BASE UNIT #B."

Base unit 20 includes a laser transmitter "T1," at reference numeral 22. Laser transmitter 22 includes a processing circuit, a memory circuit, an input/output circuit, a laser light source, and a leveling platform.

Base unit 20 contains a laser receiver "R1," in a preferred mode of this system. This laser receiver is also designated by the reference numeral 24, and includes a processing circuit, a memory circuit, an input/output circuit, and at least one photosensor. Different configurations of photosensors can be used for this laser receiver, as discussed below in greater detail.

Base unit 20 further includes an aiming platform "A1," which is designated by the reference numeral 26. This aiming platform includes an angle encoder, and an angle drive circuit. This aiming platform 26 will be described in greater detail below.

Base unit 30 includes a laser transmitter, in this instance referred to as "T2," to and designated by the reference numeral 32. Laser transmitter 32 also includes a processing circuit, memory circuit, input/output circuit, laser light source, and a leveling platform.

Base unit 30 also includes a laser receiver referred to as "R2," and generally designated by the reference numeral 34. This laser receiver also includes a processing circuit, memory circuit, input/out circuit, and photosensors.

Base unit 30 also includes an aiming platform, referred to as "A2," and generally designated by the reference numeral 36. This second aiming platform includes an angle encoder, and an angle drive circuit. These are similar to the same types of devices in the aiming platform 26, and will be discussed below in greater detail.

The system 10 also includes a remote unit, which is generally designated by the reference numeral 40 on FIG. 1. Remote unit 40 includes a processing circuit, a memory circuit, an input/out circuit, a display, and a keypad. Alternatively, remote unit 40 could include a touch screen display which would incorporate the main functions of a keypad, without having a separate keypad on the unit. The memory circuit of remote unit 40 can have two components: a first internal component, and either an external component or a "bulk memory" component, which is designated by the reference numeral 42 on FIG. 1. The external characteristic of memory circuit 42 could be comprised of a flash memory or other type of portable memory device, such as a "stick ROM." Such a portable memory device could be carried by a user, and could be plugged into a port of the remote unit 40, if desired. This will be discussed in greater detail below.

Another possible component of system 10 is a computer generally designated by the reference numeral 50. This computer is referred to as an "ARCHITECT COMPUTER," on FIG. 1. Although the owner of computer 50 may or may not truly be an architect, for the purposes of this description, it will be assumed that computer 50 includes floor plans or some other type of computer files that were either created or used by an architect, or by some type of building engineer. This assumes that the system 10 is going to be used on a jobsite in which a building will be constructed. Of course, other types of structures or perhaps highways can use the technology disclosed herein, and such a jobsite may not have any type of enclosed building structure at all.

The computer 50 includes a processing circuit, a memory circuit, and an input/output circuit. The memory circuit of computer 50 will either contain floor plans (designated at 54), or some other type of computer files such as computer-aided drafting (CAD) files at 52, on FIG. 1. It should be noted that the remote unit 40 itself could have some type of computer-aided architecture or CAD software installed thereon (depending on how "powerful" the computer/memory system is for the remote unit), and in that event, the virtual floor plan could also be directly contained in memory circuit 42, and displayed in two, or perhaps even three dimensions.

It will be understood that all of the main units illustrated on FIG. 1 include some type of input/output circuit, and these types of circuits include communications circuits. Such communication circuits possibly could be plug-in ports, such as USB ports; moreover, such input/output circuits also can include wireless communications circuits, such as low power radio-frequency transmitters and receivers, or other types of wireless communications ports that use other wavelengths, such as infrared light, for transmitting and receiving data between the various units. This type of technology is already available today, although certainly there will be newer forms invented in the future, that can still be used in the system 10 of FIG. 1.

Figure 2:
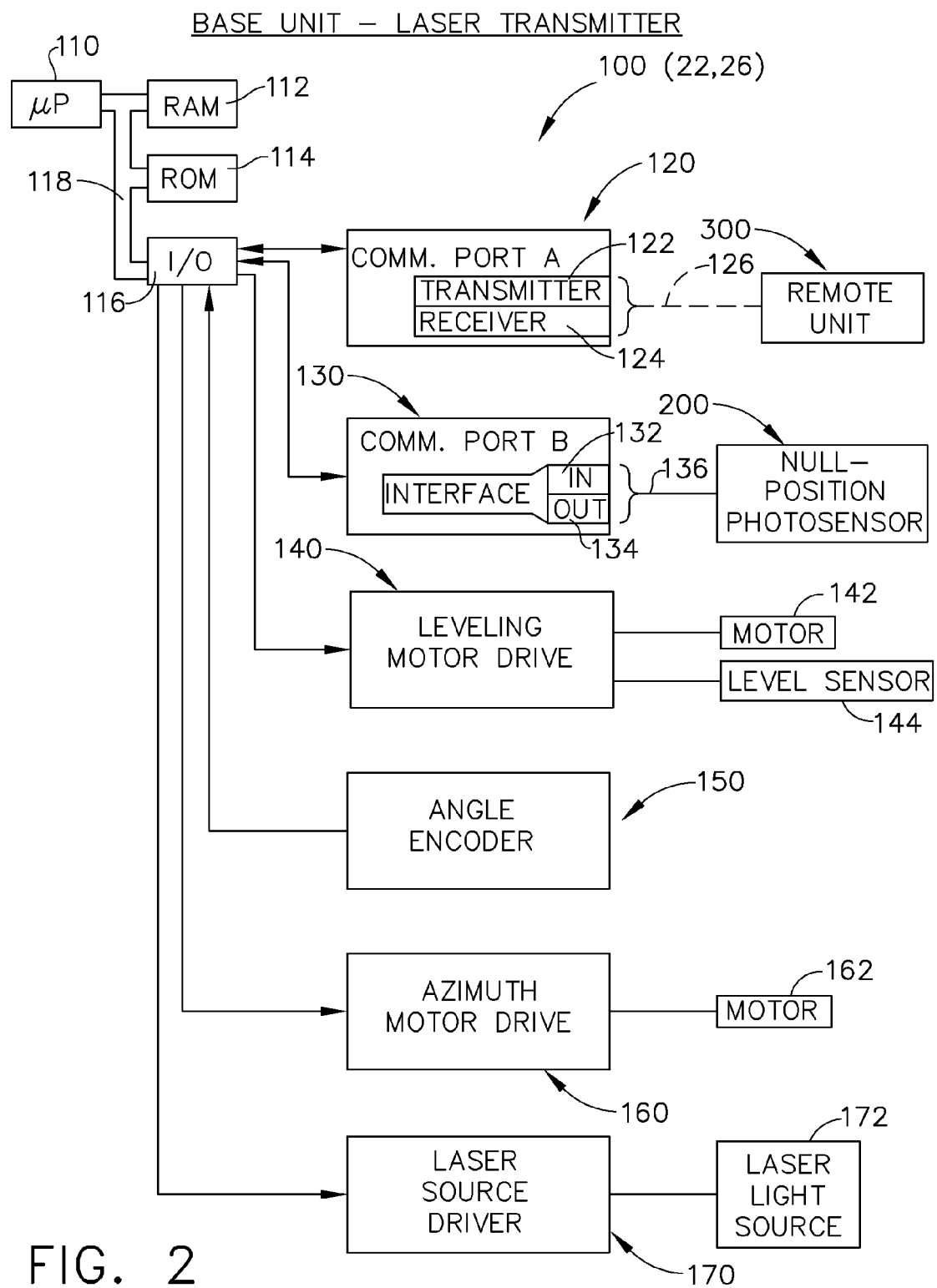
FIG. 2 is a block diagram of the major components of a laser transmitter that is part of a base unit depicted in FIG. 1.

Referring now to FIG. 2, a block diagram of a laser transmitter used in one of the base units is illustrated, and is generally designated by the reference numeral 100. Laser transmitter 100 includes a processing circuit 110, which will have associated random access memory (RAM) at 112, associated read only memory (ROM) at 114, and at least one input/output circuit at 116. These devices 112, 114, and 116 communicate with the processing circuit 110 by use of a bus 118, which typically is referred to as an address bus or a data bus, and can also contain other types of signals, such as interrupts and perhaps other types of timing signals.

The input/output circuit 116 will sometimes also be referred to herein as an I/O circuit. This I/O circuit 116 is a primary interface between the real world devices and the processing circuit 110. It is in communication with various communications devices and also various types of motor drive circuits and sensor circuits.

The input/output circuit 116 is in communication with a communications port A, which is generally designated by the reference numeral 120. Communications port 120 includes a transmitter circuit 122 and receiver circuit 124. Communications port 120 is to be provided to exchange data information with the remote unit 40, which on FIG. 2 is referred to as the remote unit 300. The communication link between remote unit 300 and communications port 120 is designated by the reference numeral 126. In a preferred mode of this system, the communication link 126 will be wireless, although certainly a cable could be connected between the communications port 120 and the remote unit 300, if desired.

A second communications port, referred to as port B is generally designated by the reference numeral 130 on FIG. 2. This port 130 comprises a data interface with an input circuit at 132 and output circuit at 134. Communications port 130 transfers data to and from a null-position photosensor, generally designated by the reference numeral 200, using a communication path 136. While it would be possible for communication link 136 to be wireless, there is no particular need for that to be so. The null-position photosensor 200 will typically be mounted directly on the base unit, as will be the laser transmitter 100. Therefore, a direct "wired" link will be typical.

Laser transmitter 100 also includes a leveling motor drive circuit, generally designated by the reference numeral 140. This drive circuit provides the voltage and current for a leveling motor 142. In addition, it receives signals from a level sensor 144, and these input signals will determine what types of commands will be sent to the motor 142 from the drive circuit 140. If desired, this can be a self-contained system that may not need to communicate with the processing circuit 110. However, the laser transmitter 100 will typically desire knowledge of whether or not the base unit has actually finished its leveling function before the laser transmitter 100 begins to function in its normal mode of operation. In addition, the processing circuit 110 may well desire to control the leveling motor drive circuit 140, essentially to keep it de-energized at times when it is not critical for the base unit to actually be attempting to level itself with respect to gravity.

Laser transmitter 100 also includes an angle encoder 150, in a preferred embodiment. Angle encoder 150 will provide input signals to the processing circuit 110, so that it knows exactly where the laser transmitter is being pointed with respect to the azimuth direction. This could be a wholly manual operation, if desired to reduce system cost by eliminating the encoder. However, for a fully automated system, the angle encoder 150 will be necessary.

Laser transmitter 100 preferable will also include an azimuth motor drive, to generally designated by the reference numeral 160. Motor drive 160 will provide the proper current and voltage to drive the azimuth motor 162, which is the motive force to aim the laser transmitter. This again could be part of a self-contained system, working with the angle encoder 150; however, on FIG. 2, it is illustrated as being controlled by the processing circuit 110.

Laser transmitter 100 also includes a laser light source driver circuit 170, which provides the current and voltage to drive a laser light source 172. This typically will be a laser diode, although it could be an other type of laser light beam emitter, if desired. As described above, the laser light source will typically be emitting visible light, although a non-visible light source could be desirable for certain applications, and a laser light source emitting infrared light could be used in that situation. The laser source driver 170 is controlled by processing circuit 110 in the configuration illustrated on FIG. 2.

The laser transmitter 100 will typically be a "fan beam" laser transmitter for use in the system 10. However, it will be understood that other types of laser light sources could be used, including a rotating laser beam, if desired. However, there must be some minimum amount of divergence to create a laser light "plane" so that the laser light will at least intersect the floor surface of a jobsite, and preferably also intersect a ceiling surface for enclosed spaces on jobsites. The system 10 will have many uses, even if the laser light source only is pointing at a floor surface, but system 10 expands its usefulness if the divergence angle of the laser plane is designed to intersect not only the floor, but also the ceiling of the enclosed space. In this description, it will be assumed that the laser light source is a fan beam laser, and so a continuous plane of laser light is being emitted by each laser transmitter 100 at both base units 20 and 30.

Figure 3:
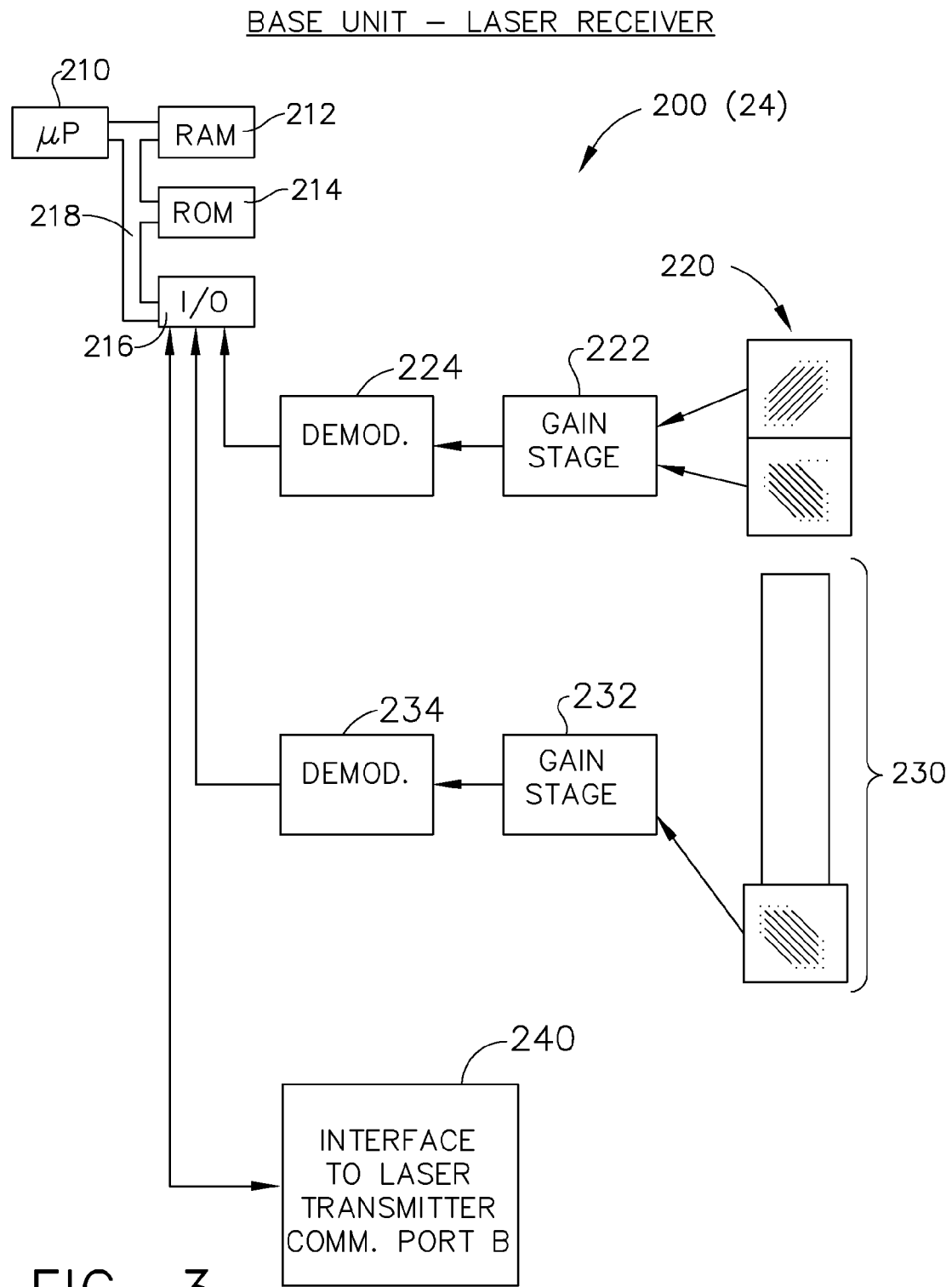
FIG. 3 is a block diagram of the major components of a laser receiver that is part of a base unit that is depicted in FIG. 1.

Referring now to FIG. 3, a laser receiver generally designated by the reference numeral 200 is depicted in block diagram form. Laser receiver 200 includes a processing circuit 210, which has associated RAM 212, ROM 214, and an input/output interface circuit 216. These devices communication with the processing circuit 210 over a bus 218, typically including at least data and address lines.

The input/output circuit 216 receives signals from some type of photosensor. On FIG. 3 two different types of photosensors are depicted. A "butt end" photosensor is to depicted at the reference numeral 220, and this assumes there are only two individual photocells. Each of these photocells of the photosensor 220 provides an electrical signal to a gain stage 222. The output of the gain stage is directed to a demodulation circuit 224, and the output of that circuit directs a signal to the I/O circuit 216. It will be understood that a demodulation circuit will not be necessary unless the laser light signals themselves are of a modulated type of signal. In most applications for the system 10, a modulated laser light signal will be desirable, and thus a demodulation circuit 224 will be used in those instances.

The second type of photosensor is depicted as a portion of what is sometimes referred to as a "rod sensor" and is designated by the reference numeral 230. An exemplary "full" rod sensor is disclosed in U.S. Pat. No. 7,110,092, which issued on Sep. 19, 2006, which disclosure is incorporated by reference herein in its entirety. It will be understood that the second photosensor 230 can comprise virtually any type of "all-around" light-sensing device, i.e., a photosensor that is able to detect incoming light from essentially any angle.

A typical "full" rod sensor would have two photocells, one at each end of the light-conducting rod. However, rod sensor 230 has only a single photocell in FIG. 3, which produces an electrical signal that is directed to a gain stage 232, which outputs a signal to a demodulation stage 234. As in the other type of photosensor circuit described above, the demodulation circuit 234 is only necessary if the laser light source emits a modulated signal, which would be typical for this system 10.

An interface circuit 240 is also provided in the laser receiver 200. This is a separate interface circuit from the I/O circuit 216. Interface circuit 240 communicates position information to the laser transmitter communications port B, which will be used in helping "aim" the laser transmitters during a portion of the set-up mode of operation, as discussed below.

Figure 4:
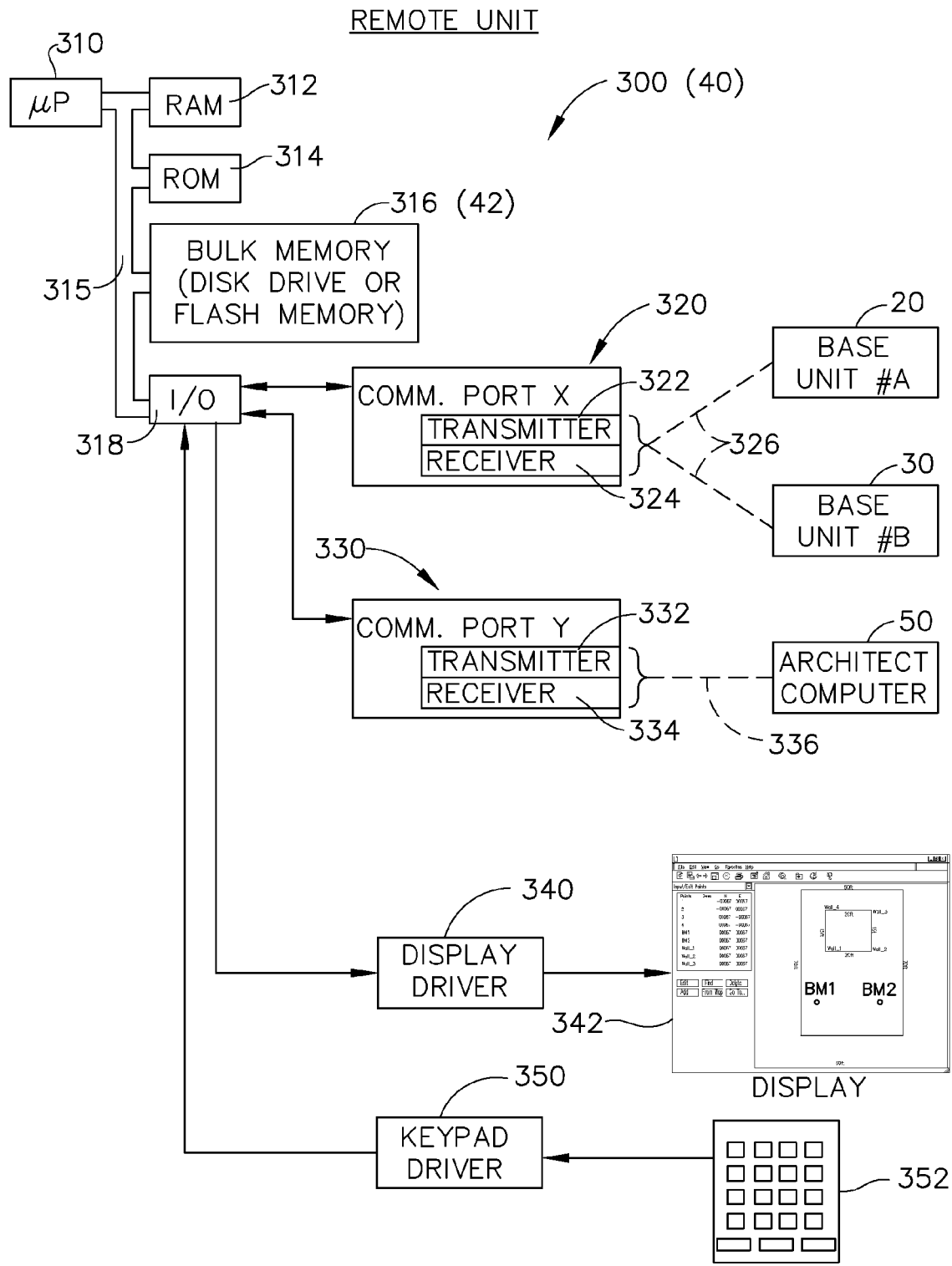
FIG. 4 is a block diagram of the major components of a remote unit that is part of the system of FIG. 1.

Referring now to FIG. 4, a block diagram is provided for a remote unit, which is generally designated by the reference numeral 300. Remote unit 300 includes a processing circuit 310, with associated RAM 312, ROM 314, some type of bulk memory or external memory 316, and an input/output circuit 318. These circuits are all in communication with the processing circuit 310 via a bus 315, which normally would carry data signals and address signals, and other types of microprocessor signals, such as interrupts.

The bulk memory 316 could be a disk drive, or perhaps some type of flash memory. If in the form of flash memory, it could be an external memory device (such as a "portable memory device") that can plug into the remote unit, via a USB port, for example. In that situation, there would be a USB interface between the bulk memory device 316 and the bus 315.

The I/O circuit 318 will be in communication with a first communications port 320, which is designated as communications port "X" on FIG. 4. Communications port 320 includes a transmitter circuit 322, and a receiver circuit 324. Communications port 320 is designed to communication with the base units 20 and 30, typically using a wireless signal via a wireless pathway 326 (as noted on FIG. 4). As described in greater detail below, the base units 20 and 30 will communicate azimuth angular information with the remote unit, and that information arrives via the wireless path 326 to and from communications port 320.

A second communications port 330 is included in remote unit 300, and this is designated as communications port "Y" on FIG. 4. Communications port 330 includes a transmitter circuit 322 and receiver circuit 334. This communications port 330 is provided to exchange information with the architect computer 50, via a communication link 336. On FIG. 4, communication link 336 is depicted as a wireless link, although it certainly could be constructed by use of an electrical cable or an optical cable, if desired. Communications port 330 will exchange floor layout data with the architect computer 50; more specifically, it can receive a floor plan and store it in the bulk memory circuit 316. In addition, if the remote unit 300 receives information about a new or "unknown" point of interest in the physical jobsite floor plan, then that information can not only be saved in the bulk memory circuit 316, but could be also communicated back to the architect computer 50, via the communications port 330 to be placed in the original floor plan. Or, a revised floor plan (which includes the new point of interest) can be saved as a file in bulk memory circuit 316, and that entire file could be transferred to the architect computer 50.

It will be understood that the architect computer 50 could comprise a "fixed" unit that essentially remains in the architect's office, and passes data to the remote unit 300 while the remote unit is physically at the office, or perhaps they remotely communicate with one another via a wide area network, such as the Internet. Alternatively, the architect computer 50 could comprise a "portable" unit that is transported to the jobsite, and communicates with portable unit 300 while on site. Finally, as portable computers become even smaller in physical size, it is more likely that the portable unit and the architect computer will eventually become merged into a single device.

A display driver circuit 340 is in communication with the I/O circuit 318. Display driver circuit 340 provides the correct interface and data signals for a display 342 that is part of remote unit 300. If remote unit 300 is a laptop computer, for example, then this would be the standard display seen in most laptop computers. Or, perhaps the remote unit 300 is a calculator-sized computing device, such as a PDA (Personal Digital Assistant), in which case the display would be a much smaller physical device. Display 342 could be a touch screen display, if desired.

One example of a type of remote unit that could work in this system (with some modification) is the portable "layout manager," which is an existing hand held computer sold by Trimble Navigation Limited, Model Number LM80. It should be noted that one cannot simply take the LM80 and immediately use it as a remote unit in the present system; the software must be modified to perform the necessary calculations, which are described below. In addition, the input/output circuits must be modified to be able to communicate commands and data both to and from the base units.

A keypad driver circuit 350 is in communication with I/O circuit 318. Keypad driver circuit 350 controls the signals that interface to an input sensing device 352, such as a keypad, as depicted on FIG. 4. Again, if the display 342 is of a touch screen type, then there may not be a separate keypad on remote unit 300, because most of the command or data input functions will be available by touching the display itself. There may be some type of power on/off switch, but that would not necessarily be considered a true keypad (and typically would not be used for entering data).

Details of System Methodology

Figure 5:
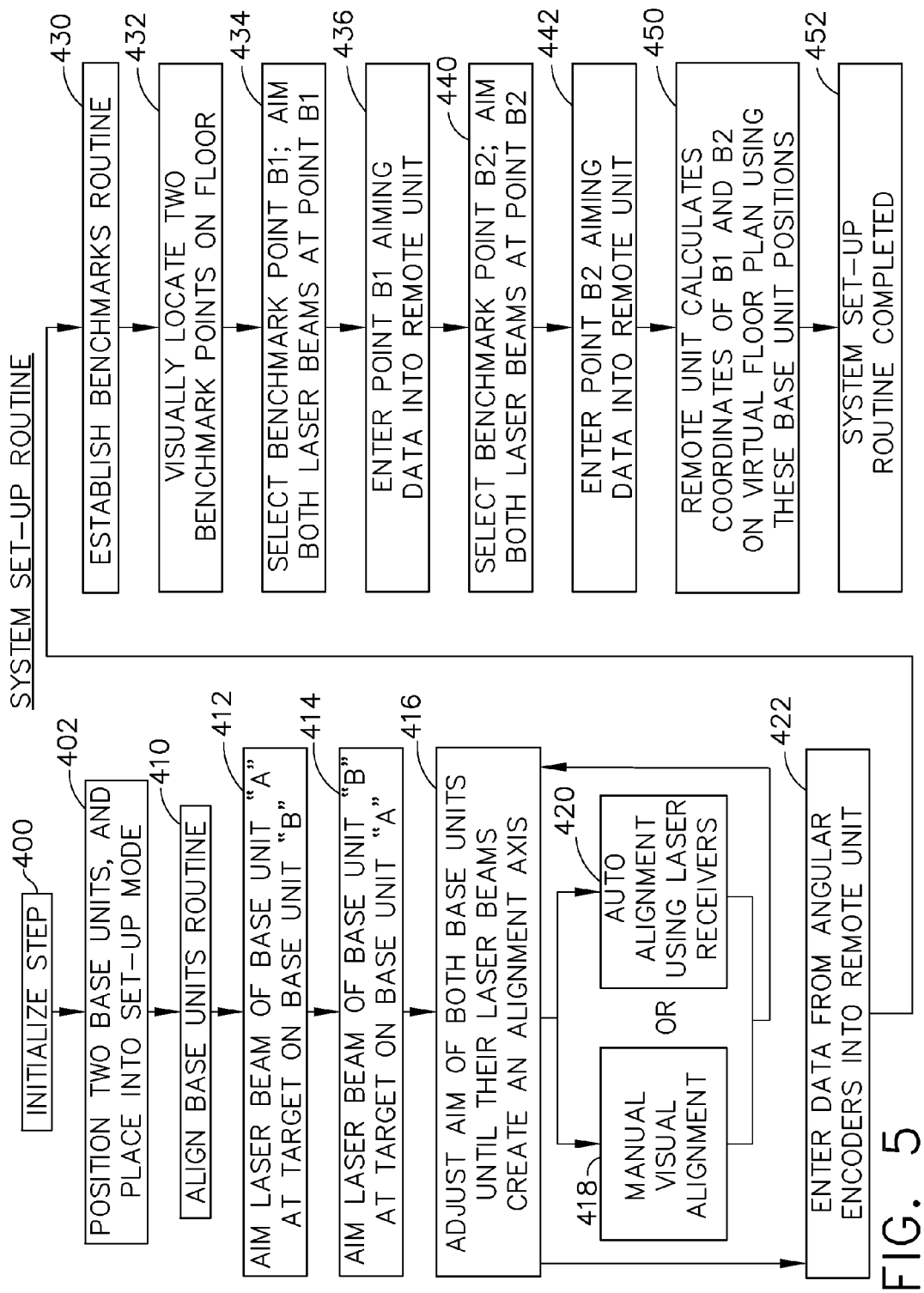
FIG. 5 is a flow chart of the steps performed by a system set-up routine, for the system depicted in FIG. 1.

Referring now to FIG. 5, a flow chart is provided for a routine that performs a system set-up function. Beginning with an initialization step 400, the user positions two base units, and then places both base units into their set-up mode of operation, at a step 402 on FIG. 5. Beginning at a step 410, the two base units are aligned using a predetermined routine. An example of how this alignment occurs is provided below, and also is illustrated beginning at FIG. 14.

At a step 412, the alignment routine begins by aiming the laser beam of base unit "A" at a target that is located on base unit "B." A similar situation occurs at the opposite laser transmitter; at a step 414 the laser beam of base unit "B" is aimed at a target on the base unit "A." (See a more detailed description below, in connection with FIGS. 14-19.)

At a step 416, the angular aim of both base units is adjusted until their laser beams create an alignment axis. If a manual or visual alignment is going to be used, then the logic flow travels to a step 418. Alternatively, an automatic alignment occurs if there are laser receivers mounted to the base units; in that situation the logic flow is directed to a step 420.

Once an alignment axis is created, a step 422 allows the operator to enter data from the angular encoders to the remote unit. The user would typically be handling the remote unit itself (i.e., remote unit 420), and by entering a command on its keypad or touch screen, the remote unit 40 will request the alignment information from both base units, and then store that angular encoder information into the memory circuit 316 of remote unit 300. Once this has occurred, the two laser transmitters of base units "A" and "B" are situated in a fixed relationship with respect to one another, and are ready for a floor layout session. The logic flow now arrives at a step 430, which begins a routine that establishes the benchmarks.

To establish benchmarks, a step 432 requires the user to visually locate two benchmark points on the floor surface at the jobsite. At a step 434, the user selects a first benchmark point, designated "B1." The user now aims both laser beams for base unit A and base unit B at this point B1. This will be very easy to do, because the laser beams are actually vertical laser planes, and if the light emanating from the laser transmitters comprises visible light, then there will be a thin line of visible light crossing the floor surface from each of the base units A and B. After both laser beams are aimed directly at the first benchmark point B1, then there will be an intersection of the two laser beams exactly at benchmark point B1. Once that occurs, the user can enter the aiming data for point B1 into the remote unit at a step 436. This establishes the angular relationship between the two base units A and B and the first benchmark point B1.

The user now selects a second benchmark point "B2," at a step 440. Both laser beams from both base units are now aimed at point B2, in a similar fashion to that described above for benchmark point B1, at step 434. After both laser beams are correctly pointed, there will be a visible line intersection exactly at benchmark point B2, and the user will easily see this if the laser beams are emanating visible light. Once that has occurred, the user can enter the point B2 aiming data into the remote unit, at a step 442.

Once the remote unit has both sets of aiming data for both benchmark points B1 and B2, then a step 450 allows the remote unit to calculate the coordinates of benchmark points B1 and B2 on the virtual floor plan that is contained in the memory circuit 316 of the remote unit 300, using these base unit positions. These calculations can use a set of example equations that are provided hereinbelow:

The following are general case calculations for setting up the system. It is expected that the two transmitters will be placed in some convenient locations for the job site. The axis between the two transmitters will be established by aligning the fan beams relative to each other. It will be desired to calculate the distance between the two transmitters. See, FIG. 22 for a diagram that illustrates the relationship of physical points and angles involved in the set-up routine.

Definitions:
T1 Transmitter 1
T2 Transmitter 2
B1 Benchmark 1 (Known point—previously established)
B2 Benchmark 2 (Known point—previously established)
A1 Axis between the two transmitters Knowns:
D Distance between Benchmark 1 and Benchmark 2
A1 The axis between the two transmitters.
α Angle transmitter 1 measures from the axis A1 to Benchmark 2
γ Angle transmitter 2 measures from the axis A1 to Benchmark 1
β Angle Transmitter 1 measures between Benchmark 1 and Benchmark 2
δ Angle Transmitter 2 measures between Benchmark 1 and Benchmark 2

It is desired to find the distance 'd' between the transmitters T1 and T2:

$$\frac{d}{\sin(\pi - \alpha - \beta - \gamma)} = \frac{a}{\sin(\gamma)} \qquad \text{Eq. 1}$$

$$\tan(\gamma) = \frac{a \cdot \sin(\alpha + \beta)}{r}$$

$$r = \frac{a \cdot \sin(\alpha + \beta)}{\tan(\gamma)} \qquad \text{Eq. 3}$$

$$\frac{d}{\sin(\pi - \alpha - \gamma - \delta)} = \frac{b}{\sin(\alpha)} \qquad \text{Eq. 2}$$

$$\tan(\alpha) = \frac{b \cdot \sin(\gamma + \delta)}{s}$$

$$s = \frac{b \cdot \sin(\gamma + \delta)}{\tan(\alpha)} \qquad \text{Eq. 4}$$

$$\sin(\rho) = \frac{b \cdot \sin(\gamma + \delta) - a \cdot \sin(\alpha + \beta)}{D} \qquad \text{Eq. 5}$$

$$r + s - d = D \cdot \cos(\rho) \qquad \text{Eq. 6}$$

From Eq. 1:
$$a = \frac{d \cdot \sin(\gamma)}{\sin(\pi - \alpha - \beta - \delta)}$$

Substitute Eq. 1 into Eq. 3:

$$r = \frac{d \cdot \sin(\gamma) \cdot \sin(\alpha + \beta)}{\sin(\pi - \alpha - \beta - \gamma) \cdot \tan(\gamma)} \qquad \text{Eq. 7}$$

From Eq. 2:
$$b = \frac{d \cdot \sin(\alpha)}{\sin(\pi - \alpha - \gamma - \delta)}$$

Substitute Eq. 2 into Eq. 4:

$$s = \frac{d \cdot \sin(\alpha) \cdot \sin(\gamma + \delta)}{\sin(\pi - \alpha - \gamma - \delta) \cdot \tan(\alpha)} \qquad \text{Eq. 8}$$

Substitute Eq. 1 and Eq. 2 into Eq. 5:

$$\rho = \sin^{-1}\left[\frac{d \cdot \sin(\alpha) \cdot \sin(\gamma + \delta)}{D \cdot \sin(\pi - \alpha - \gamma - \delta)} - \frac{d \cdot \sin(\gamma) \cdot \sin(\alpha + \beta)}{D \cdot \sin(\pi - \alpha - \beta - \gamma)}\right] \qquad \text{Eq. 9}$$

Substitute Eq. 7 and Eq. 8 into Eq. 6:

$$d = \frac{D \cdot \cos(\rho)}{\dfrac{\sin(\gamma) \cdot \sin(\alpha + \beta)}{\sin\left(\dfrac{\pi - \alpha -}{\beta - \gamma}\right) \cdot \tan(\gamma)} + \dfrac{\sin(\alpha) \cdot \sin(\gamma + \delta)}{\sin\left(\dfrac{\pi - \alpha -}{\gamma - \delta}\right) \cdot \tan(\alpha)} - 1} \qquad \text{Eq. 10a}$$

Eq. 10a can also be written:

-continued $$d = \frac{D \cdot \cos(\rho) \cdot \sin\left(\frac{\pi - \alpha -}{\beta - \gamma}\right) \cdot \sin\left(\frac{\pi - \alpha -}{\gamma - \delta}\right) \cdot \tan(\gamma) \cdot \tan(\alpha)}{\sin(\gamma) \cdot \sin(\alpha + \beta) \cdot \sin\left(\frac{\pi - \alpha -}{\gamma - \delta}\right) \cdot \tan(\alpha) +}$$
$$\sin(\alpha) \cdot \sin(\gamma + \delta) \cdot \sin\left(\frac{\pi - \alpha -}{\beta - \gamma}\right) \cdot$$
$$\tan(\gamma) - \sin\left(\frac{\pi - \alpha -}{\beta - \gamma}\right) \cdot \sin\left(\frac{\pi - \alpha -}{\gamma - \delta}\right) \cdot \tan(\gamma) \cdot \tan(\alpha)$$

Eq. 10b

At this point is can be seen that two independent equations exist here: Eq. 9 and Eq. 10. These can be solved simultaneously through various numerical method techniques.

Once the calculations have been completed and both benchmarks have been entered into remote unit 300, the logic flow arrives at a step 452, in which the system set-up routine is now completed. The positions of both base units A and B have been "registered" or "mapped" into the virtual floor plan, which is stored either in the bulk memory circuit 316 of the remote unit 300 (which could be a removable flash memory chip), or is stored in the architect computer 50, which is in communication with the remote unit 300 via its communication port Y (at 320). The system is now ready to locate other points on the floor plan.

It should be noted that, if the two base units 20 and 30 had been previously positioned at the same locations where they currently rest, then in theory, the set-up procedure of the flow chart of FIG. 5 would not be necessary now. However, the user may desire to verify those base unit positions, to be certain that one of the base units had not been moved without knowledge of the user. Their positions can be easily verified by commanding the two base units to "aim" at the benchmark points, one benchmark at a time. If the base units had not be moved, then the laser light lines projected by laser transmitters 22 and 32 will form intersecting lines exactly at the correct physical locations on the jobsite floor surface, and this quickly verifies the set-up parameters.

Figure 6:
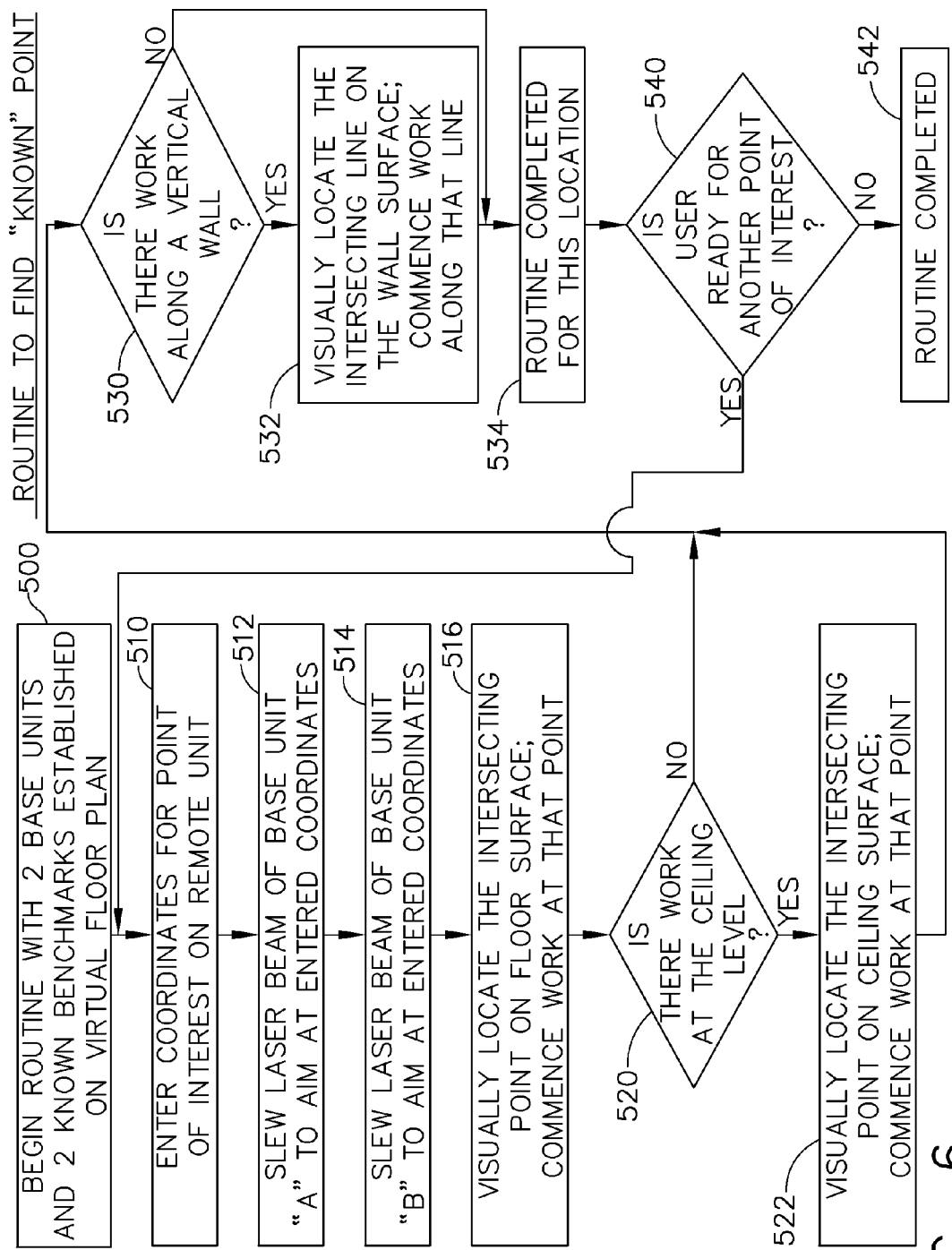
FIG. 6 is a flow chart of the steps performed by a routine to find a "known" point on a floor layout plan, using the system of FIG. 1.

Referring now to FIG. 6, a flow chart is provided for a routine to find a "known" point on the virtual floor plan. The routine begins at a step 500, in which two base units and two known benchmarks have been established on the virtual floor plan of the remote unit 300. The logic flow now is directed to a step 510, in which the user enters coordinates for a point of interest. This entry is done via either an input sensing device 352 (e.g., a keypad), or via a touch screen display (such as display 342) of the remote unit 300. These coordinates can be entered using the virtual floor plan that was on the architect's computer 50, and those coordinates will be automatically translated to a set of aiming data for the base units that contain the laser transmitters.

In essence, the coordinates for this known point of interest have already been "predetermined" as far as the virtual floor plan is concerned; the known point of interest has already been "registered" or "mapped" in the memory of the computer that holds the virtual floor plan. In previous (conventional) layout systems, the difficult part has been to now identify, on the actual physical jobsite floor surface, exactly where that known point of interest is located, so that work may be performed at the correct position.

The first laser beam of base unit "A" is slewed to aim the laser beam at the entered coordinates, at a step 512. In a similar manner, a step 514 causes the laser beam to be slewed for the base unit "B" to aim at the same set of entered coordinates. After this has occurred, the two laser planes from base units A and B will intersect on the floor surface at the designated coordinates. The user, at a step 516, can now visually locate the intersecting to point on the floor surface, and can commence work at that point.

The logic flow now arrives at a decision step 520, where it determines if there will be work at the ceiling level. If not, the logic flow is directed to a step 530. If the answer is YES, then the user will visually locate the intersecting point of the two laser planes on the ceiling surface at a step 522. The user will now be able to commence work at that point. This would be useful for installing sprinklers, smoke detectors, or lighting fixtures, for example, as per the architect's plan.

The logic flow now arrives at a decision step 530, where it determines whether or not there will be work along a vertical wall. If not, then the logic flow is directed to a step 534. If the answer is YES, then the user will visually locate the intersecting line on the wall surface at a step 532. This is the implied plumb line that exists between the floor and ceiling intersecting points of the two laser planes. Now that a wall surface has the vertical plumb line visible along the wall's surface, the user can commence work along that line. This can be useful for placing electrical outlets, or for framing, or even for positioning the wall in the first place.

The logic flow now arrives at a step 534, and the routine is now completed for this location. A decision step 540 now determines whether or not the user is ready for another point of interest. If not, the logic flow is directed to a step 542, where this routine is completed. If the user is ready for another point of interest, then the logic flow is directed back to step 510, which allows the user to enter coordinates for a new point of interest on the remote unit 300.

An example set of position calculations is provided below. This calculation set describes a method to solve for the aiming angles when laying out the location of a known point of interest once the system is set up; it solves for the angles each transmitter must drive to in order to present a point of interest that is desired to be found. See, FIG. 23 for a diagram that illustrates the relationship of physical points and angles involved in the routine for locating a known point of interest.

Definitions:
T1 Transmitter 1
T2 Transmitter 2
B1 Benchmark 1 (Known point—previously established)
B2 Benchmark 2 (Known point—previously established)
A1 Axis between the two transmitters
Knowns:
d Distance between transmitters
A:$(X_A, Y_A)$ Coordinates of the Point of Interest to be Found
Process:
1) Enter the coordinates of the Point of interest into the system remote.
2) Transmitters 1 and 2 drive to the corresponding angles θ and ϕ needed to present point A:$(X_A, Y_A)$.
3) Visually locate where the planes intersect.
From the Diagram:
a=$X_A$ and b=$Y_A$
Solving for θ and ϕ:

$$\theta = \tan^{-1}\left(\frac{b}{a}\right) \qquad \phi = \tan^{-1}\left(\frac{b}{d-a}\right)$$

Figure 7:
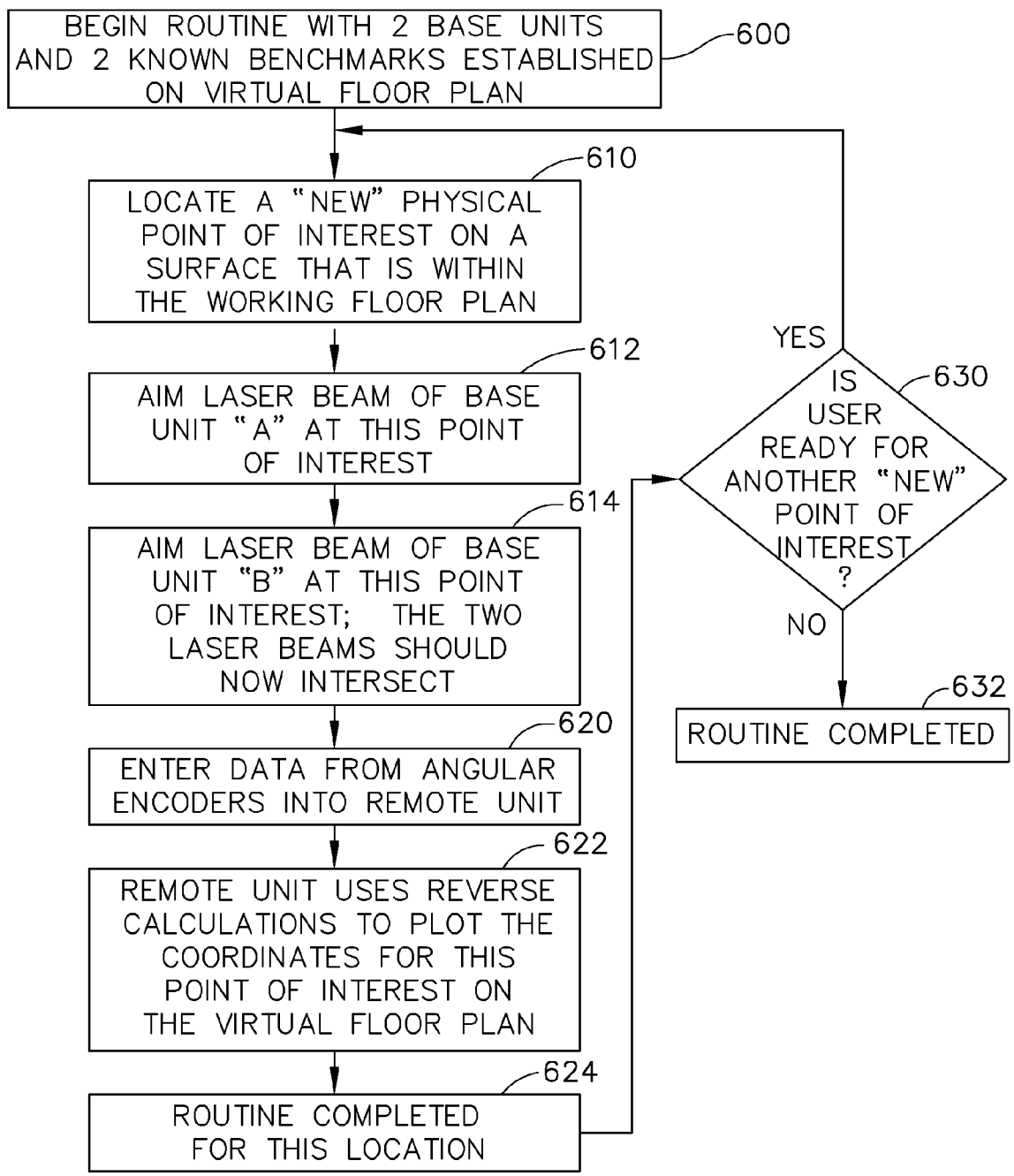
FIG. 7 is a flow chart of the steps performed by a routine to enter an "unknown" point on a jobsite, using the system of FIG. 1.

Referring now to FIG. 7, a routine to enter an "unknown" point is provided as a flow chart. The routine begins at a step 600, in which two base units and two known benchmarks have already been established on the virtual floor plan at this step. A step 610 now locates a "new" physical point of interest on a surface that is within the working floor plan. This new point of interest is not already plotted on the virtual floor plan—if it was, it would not be "unknown." Instead, this new point is something that the user has decided should be now plotted on the virtual floor plan, and it is a physical point that the user can actually see, and that he/she wants to now have memorialized within the floor plan computer files.

After the new point of interest has been physically located at step 610, a step 612 requires the user to aim the laser beam of base unit "A" at this point of interest. This means that the user must command (or manually slew) the laser beam directly at the point of interest, so that the plane of laser light creates a line along the floor surface (assuming this point is on the floor surface) until that line visually crosses the point of interest.

After base unit "A" has been aimed at step 612, a step 614 now requires the user to aim the laser beam of base unit "B" at the same new point of interest. Again, the laser plane from base unit "B" will create a line of laser light along the floor surface (again assuming this is a point on the floor surface), and this creates a visible line that emanates away from base unit "B" and, after being properly aimed, the laser light will visually cross the new point of interest. At the end of this aiming phase in step 614, both laser planes should now intersect (as visible light lines on the floor surface) exactly at the point of interest.

The angular encoders will now have azimuth information that can be stored, and a step 620 enters data from the angular encoders of both base units into the remote unit. (This would typically occur via a user command entered on the remote unit.) Once the remote unit has this data, a step 622 causes the remote unit to execute a reverse calculation to plot the coordinates for this point of interest on the virtual floor plan. Once that has occurred, the unknown point of interest is now "registered" on the virtual floor plan, and that point of interest essentially becomes a "known" point of interest and thereby can be "found" later, even if the base units 20 and 30 are moved to other locations. A step 624 now is reached, at which the routine has been completed for this particular location (i.e., at this point of interest).

Alternatively, if the base units do not have azimuth encoders, then they will be equipped with a visual angle scale that the user can see on an upper surface of the base units. After the user has (manually) aimed the laser transmitter for each base unit (at steps 612 and 614), then he/she may read the azimuth angular displacement for both laser transmitters, and to that information can then be manually entered into the remote unit at step 620 (using its input sensing device 352). Once the remote unit has this data, steps 622 and 624 are performed, as described above.

A decision step 630 now determines whether or not the user is ready for another "new" point of interest. If not, then the entire routine of FIG. 7 has been completed at a step 632. On the other hand, if the user has another point of interest to be plotted at this time, then the logic flow is directed back to step 610, in which the user locates that other physical point of interest on a surface that is within the working floor plan.

By using the routine depicted in the steps of the flow chart on FIG. 7, a user can easily choose any point of interest on the jobsite that is within a non-interrupted view of both laser transmitters in both base units. Once the user has located that physical point, it is a simple matter to aim both laser transmitters directly at that point to create two intersecting lines of laser light from the laser planes emitted by the two laser transmitters. This is very easy to do, because the user can see everything that is going on, assuming the laser transmitters are emitting visible light. Even if the light is infrared, for example, the user could be utilizing special night-vision goggles to locate these points, if desired. This non-visible light scenario might be quite useful for applications that are to occur in the dark, and might even have military applications (for plotting positions of mines in a minefield, for example).

This routine of FIG. 7 can be performed much more quickly than a typical surveying function that is being performed countless times on jobsites using earlier technology. No type of surveyor's rod is necessary, and such a rod would not need to be positioned and plumbed for each new point of interest, such as is required in many of the systems using available conventional technology.

If the user selects a point that is not within direct visible range of one of the laser transmitters, it is a simple matter to move that particular laser transmitter to a different location within the virtual floor plan and re-establish its set-up function using the routine illustrated as a flow chart in FIG. 5. Once the laser transmitter has been placed at a new location, its position can easily be established with benchmarks that are always available on a new jobsite, and once everything has been registered with the remote unit, the user can directly begin to enter unknown points, using the flow chart of FIG. 7.

An example set of reverse calculations is provided below. This calculation set describes a method to solve for the coordinates for the location of an unknown point of interest once the system is set up. See, FIG. 24 for a diagram that illustrates the relationship of physical points and angles involved in the routine for entering an unknown point of interest.

Definitions:
T1 Transmitter 1
T2 Transmitter 2
B1 Benchmark 1 (Known point—previously established)
B2 Benchmark 2 (Known point—previously established)
A1 Axis between the two transmitters
Knowns:
d Distance between transmitters
θ Angle measured by transmitter 1 from the axis between transmitters and the point of interest
φ Angle measured by transmitter 2 from the axis between transmitters and the point of interest
Process:
1) Command each transmitter to place each respective fan beam over the point of interest.
2) Transmitters 1 and 2 measure the angles θ and φ.
3) Since d is known from the system setup, the coordinates of point a can be calculated.
From the Diagram:

$$y_0 = \frac{d}{\frac{1}{\tan(\theta)} + \frac{1}{\tan(\phi)}}$$

This can be Written:

$$y_0 = \frac{d \cdot \tan(\phi) \cdot \tan(\theta)}{\tan(\theta) + \tan(\phi)}$$

And:

$$x_0 = \frac{y_0}{\tan(\theta)}$$

Further Operating Details

Figure 8:
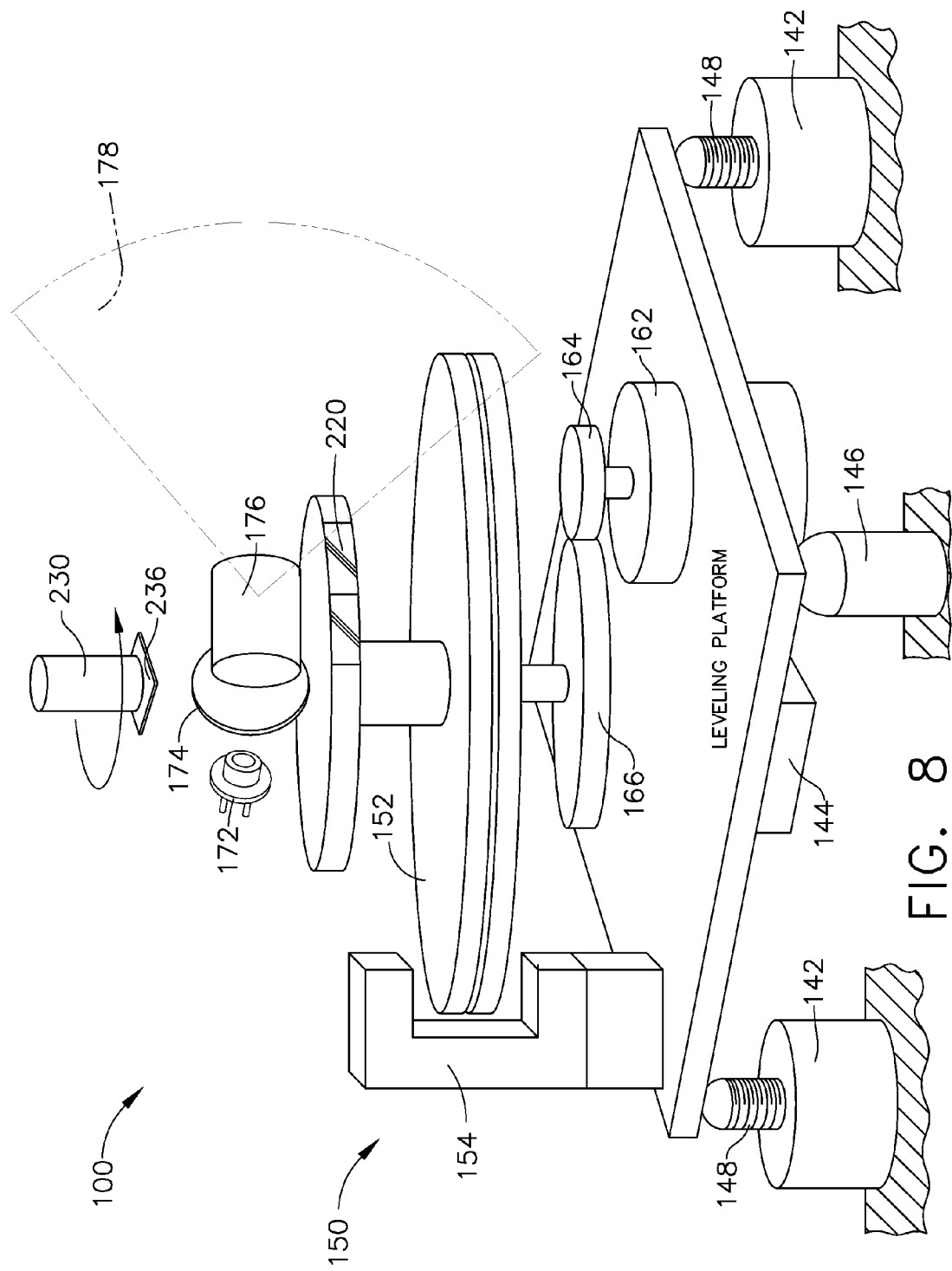
FIG. 8 is a diagrammatic view of an "automatic" base unit, as used in the system of FIG. 1.

Referring now to FIG. 8, a diagrammatic view is provided for the main "mechanical" components found in a base unit, including a laser transmitter and a laser receiver. The base unit is generally designated by the reference numeral 100, and includes a leveling platform at the bottom of the structure, upon which is mounted a rotational unit for adjusting the azimuth angle of the laser transmitter. The leveling platform includes two leveling motors 142, a level sensor 144 (e.g., some type of electronic gravity sensor), and a pivot 146. Above the leveling motors 142, are leadscrews 148, and the horizontal leveling platform is mounted on the top of the leadscrews 148.

It will be understood that a manual leveling platform could be provided with base unit 100, rather than the "automatic" leveling platform described in the previous paragraph. Such a manual leveling platform could use a pendulum or a visible bubble, for example, and there would be no automatic gravity sensing device or leveling motor drive.

On the upper surface of the leveling platform is the azimuth motor 162, which has output shaft and a pinion gear 164, which meshes with a spur gear 166. The spur gear has an output shaft that is vertical, which runs through an encoder disc subassembly 152 and up to a second wheel or disc that includes a pair of butt cell photosensors 220. The encoder disc subassembly 152 typically has some type of visible markings that can be detected by an to encoder readhead, which is located along the outer perimeter of the encoder disc. On FIG. 8, the encoder readhead is designated by reference numeral 154, and the overall angle encoder system 150 includes both the encoder disc subassembly 152 and the encoder readhead 154. Typical optical encoders have a fixed portion and a rotatable portion, as depicted on FIG. 8 by the two parallel disc structures in subassembly 152.

A laser diode 172 is mounted (in this diagrammatic view) in the horizontal direction, and it emits a laser light beam through a collimating lens 174, and that laser light travels through a cylinder lens 176 to create an output fan beam 178. The fan beam 178 is diagrammatically presented on FIG. 8 as a diverging plane of laser light.

In this arrangement, the azimuth motor 164 turns the aiming direction of the fan beam laser plane of light 178, and this simultaneously moves the butt cell photosensors 220 and a portion of the encoder disc subassembly 152. In a typical arrangement, the split between the butt cell photosensors will be along the same vertical line as the edge view of the fan beam laser plane of light 178. However, it should be noted that the butt cell photosensors 220 could be somewhat offset from the centerline of the plane of laser light 178, and the calculations for determining positions of various points in the floor layout system could be adjusted by those offset calculations, especially for determining/establishing an alignment axis. This optional arrangement, sometimes referred to as "characterizing" the photosensors, can make it somewhat easier to construct the base unit, if desired.

A second photosensor is provided on FIG. 8. This is a "rod" sensor, and is depicted at reference numeral 230. In this rod sensor, however, there is only a single photocell at 236. Although a typical position-sensing rod sensor would have two photocells (as depicted in FIG. 3), in the configuration of FIG. 8, the information being sought only requires a single photocell. In the base unit 100, the information being sought is whether or not laser light is impacting the rod sensor cylindrical surface, and if so, a single photocell at 236 will detect that event. On the other hand, if greater sensitivity is desired, or if the manufacturer wishes to use a standard rod sensor that already has two photocells mounted to the cylindrical rod (one on each end), then a standard rod sensor could be used, as depicted on FIG. 3.

As indicated on FIG. 8, the azimuth motor drive 162 can rotate the entire upper portion of the base unit in the horizontal plane; i.e., the rotational axis is essentially to vertical, once the leveling platform has adjusted itself to making the system substantially horizontal with respect to gravity.

An alternative arrangement could be used to build a lesser expensive base unit 100. The photosensor 220 could be replaced by a small reflector that is precisely positioned to be in vertical alignment with the centerline of the plane of laser light 178. In this alternative embodiment, the opposite laser transmitter would have to be manually aimed at the reflector, when determining an alignment axis. This certainly would be more difficult to set up than the automated procedure that is described below, but it is possible, particularly for short-range situations in which the distance between the base units is relatively small. The laser receivers 24 and 34 could be entirely eliminated in this alternative embodiment.

Another way to reduce system cost is to eliminate the automatic azimuth aiming platform altogether, and instead rely on manual aiming of the laser transmitters for both base units. This second alternative embodiment would save the cost of the azimuth drive (including motor 162) and the encoder system 150. Of course, the "aiming" azimuth angles then would have to be read manually from an arcuate scale on the base unit, and these angles would have to be entered manually into the remote unit by the user every time the laser transmitter is aimed at a new benchmark point, a known point of interest, or an unknown point of interest. The possibility of errors in data entry would increase, even if the azimuth angles are correctly read in the first place.

Referring now to FIGS. 9-13, a set of illustrations is provided to more readily demonstrate the ease of use of the system being disclosed herein. In FIG. 9, a first step for aligning the axes of the two laser transmitters is depicted. The laser transmitters are part of the base units 20 and 30, which are mounted on tripods in FIG. 9. A user, generally designated by the reference numeral 45, is depicted as holding a hand-held remote unit 40, within the confines of an enclosed space (or room) 700. The room 700 has a ceiling surface 710 and floor surface 712.

The laser transmitter at base unit 20 emits a laser fan beam, which has an upper angular limit line at 722 and a lower angular limit line at 724. The other laser transmitter at base unit 30 also emits a fan beam of laser light, and has an upper angular limit line at 732 and a lower angular limit line at 734. The object in this step of FIG. 9 is to align an axis 740 between the two laser transmitters. The methodology for a detailed alignment to procedure is described below, in reference to FIGS. 14-19. At this point in the description, it will be assumed that the alignment axis 740 is being determined by this procedure.

FIG. 10 illustrates the next step, which aligns the two laser transmitters to a first benchmark point (referred to on FIG. 10 as "Benchmark 1"). In FIG. 10, the interior space (or room) is referred to as reference numeral 701. The two laser transmitters have been aimed at the point of interest that is Benchmark 1, and is designated by the reference numeral 752. The two base units 20 and 30 have either had their lasers manually aimed by the user, or automatically adjusted by the user using the remote unit 40, if azimuth positioning motors and encoders are available on base units 20 and 30. After the two laser planes have been aimed so that they will intersect the first benchmark at 752, the laser planes will have an appearance as illustrated on FIG. 10. The laser plane from the fan beam laser transmitter of base unit 20 will again have angular limit lines 722 and 724, but will also produce a visible line along the ceiling at 726, and a similar visible line along the floor surface at 728. In a similar manner, the laser transmitter producing the fan beam from base unit 30 will emit angular limit lines 732 and 734, and also produces an upper visible line along the ceiling at 736 and a lower visible line along the floor surface at 738.

It will be understood that, as used herein, the terms "visible light" or "visible laser light" refer to laser light beams that are either directly visible by the human eye (i.e., having a wavelength in the range of approximately 430 nm to 690 nm), or refer to laser beams that are somewhat outside of the above "normal" range of visible acuity for human eyes, and the user is being aided by some type of special lenses. For example, the laser transmitters described herein could produce infrared (IR) laser light beams if desired, and the user could be wearing night-vision goggles; in that situation, the laser light beams would appear to be "visible" to that user, which is more or less necessary to properly use the alignment and location features of the system described herein.

The two lower laser plane edges 728 and 738 will intersect exactly at the benchmark point 752, after the two laser transmitters have been correctly adjusted for their angular position along the azimuth direction, and the user will be able to visibly see that intersection point. Moreover, the two laser planes will intersect along a vertical line 750, which will be a plumb line if the two base units have been correctly leveled. This laser line of intersection 750 will actually be visible if a solid object, or some type of smoky substance, is positioned along the line itself. At the top of the laser light line 750 will be another visible to intersection of "horizontal" lines along the ceiling, which will be described below, in greater detail.

The third step is to align the laser transmitters for the two base units to the second benchmark point, which is referred to on FIG. 11 as "Benchmark 2" The interior space (or room) is designated at the reference numeral 702 in FIG. 11. The user now is required to move the angular positions of both laser transmitters for the base units 20 and 30 so that they are aimed at the second benchmark, which is designated at reference numeral 762. Both laser transmitters continue to emit a plane of laser light, and the fan beam thereby produced has divergence angles that are represented by the lines 722, 724, 732, and 734. Furthermore, there will be upper and lower visible lines along the ceiling surface and floor surface, which again are designated by the line segments 726, 728, 736, and 738.

After the two laser transmitters have been properly aimed at the second benchmark 762, the lower visible lines of the two laser planes will intersect exactly at benchmark 762, and the user will be able to visibly see that intersection point.

It will be understood that, as used herein, the phrase "intersect exactly" at a specific point on a surface means that the user has adjusted the laser transmitters so that their emanating laser fan beams produce light lines that appear to be precisely crossing that specific point. Of course, there will likely be some small tolerance of error, and it is up to the user to make the proper adjustments in aiming the base unit laser transmitters so that the light lines are as close to "exactly" crossing right at the proper location. Since the laser light lines have a discernable width, the user cannot literally align the laser beams within some imperceptible tiny distance, and thus, there will likely be a very small tolerance of error in such "exact" positions of the laser transmitter azimuth angles. However, this is a very small error indeed, and moreover, the user will quickly become very good at making these azimuth position changes of the laser transmitters such that any such errors will essentially be negligible.

As in the case of FIG. 10, there will also be an intersecting vertical line between the two laser planes, and this intersecting line is represented at the reference numeral 760 on FIG. 11. This intersecting line 760 is a plumb line, so long as the two laser transmitters have been properly leveled.

After both benchmark points have had their coordinates entered into the to remote unit 40 (as per FIG. 10 and FIG. 11), the set-up of the system has been completed. Now the user will be able to enter other coordinates of interest into the remote unit 40, and cause the laser transmitters to automatically aim at those coordinates (assuming the laser transmitters are motorized and have angular encoders). FIG. 12 illustrates such a situation, in which the user has entered the coordinates of a floor point designated by the reference numeral 772 on FIG. 12. The enclosed space (or room) is designated at the reference numeral 703 on FIG. 12. The laser transmitters have been aimed so that their fan beams each produce a plane of laser light that is vertical, and both of these planes of laser light intersect exactly at the point 772 along the floor surface 712. There will also exist a vertical line of intersection between the two laser planes at the reference numeral 770. This will be a plumb line, as described before, so long as the laser base units 20 and 30 have been correctly leveled. More importantly, the two laser transmitters need to output laser planes that are substantially vertical with respect to gravity; if that correctly takes place, then the implied line 770 will also be substantially vertical with respect to gravity.

Since the plumb line 770 exists as a vertical line directly above the floor point 772, there will also be visible to the user a ceiling transfer point that is designated by the reference numeral 774. The user will see a pair of intersecting lines at point 774, which are produced by the two upper edges of the laser planes from the laser transmitters of base units 20 and 30. These are the upper edge lines of the fan laser beams along the line segments 726 and 736, which follow along the surface of the ceiling 710. This provides the user with a virtually instantaneous transfer point along the ceiling surface, every time the user first designates a floor point of interest. The ceiling transfer point 774 is automatically plumb above the floor point 772, since the implied line 770 is truly plumb. This system allows the building designer to lay out devices that are to be installed in the ceiling by using the coordinates on a two-dimensional floor plan, if desired.

The technology disclosed herein automatically can take floor points and transfer those coordinates to the ceiling; furthermore if the building plan was a three-dimensional plan, then a ceiling set of coordinates could first be entered instead of a floor set of coordinates. In that mode of operation, the two laser transmitters of base units 20 and 30 will still be able to slew automatically so that their laser fan beams will intersect the ceiling set of coordinates instead of the floor set of coordinates. The final appearance will be the same, just like what is illustrated in FIG. 12. The only difference will be that the ceiling to point was determined first, instead of the floor point. There will still exist a plumb line 770 after the ceiling point has been laid out.

Referring now to FIG. 13, the ability of the system disclosed herein to create a vertical plumb line of laser light will be used advantageously. An enclosed space (or room) 704 is depicted on FIG. 13, and the two laser transmitters of base units 20 and 30 have been aimed at a floor point 782 that is located just along the edge of one of the walls, which is designated by the reference numeral 714. The laser fan beams will create a visible plumb line of laser light 780 that will be visible along the surface of the wall 714. There also will exist a ceiling intersecting point at 784, that is the top point of the line segment 780 that makes up this intersecting line between the two planes of laser light. For the implied laser plumb line 780 to be visible along the wall surface, the wall must be positioned at or fairly close to the intersecting point 782; this can be termed a "proximal" relationship—the wall must have its surface 714 proximal to the point 782, or the intersecting line of laser light 780 will "miss" the wall surface, and not be visible on that wall surface. Of course, the wall itself must be fairly plumb, or the plumb line 780 will not properly appear along the wall's surface.

As discussed in the previous paragraph, if a two-dimensional floor plan is available, then the user can start with the floor intersecting point 782 as the point of interest. On the other hand, if a three-dimensional set of floor plans is available, and if the ceiling intersecting point 784 has coordinates that are available to the user, then that point could be used to cause the laser transmitters to be aimed as depicted in FIG. 13.

After the plumb line 780 appears along the wall surface 714, the user can use that plumb line to help align and set studded wall. In addition, once the walls have been installed, the vertical plumb line 780 can be used to help locate the positions for installation of wall outlets or HVAC ducts or vents, and other similar devices that are placed in walls of buildings.

Figure 14:
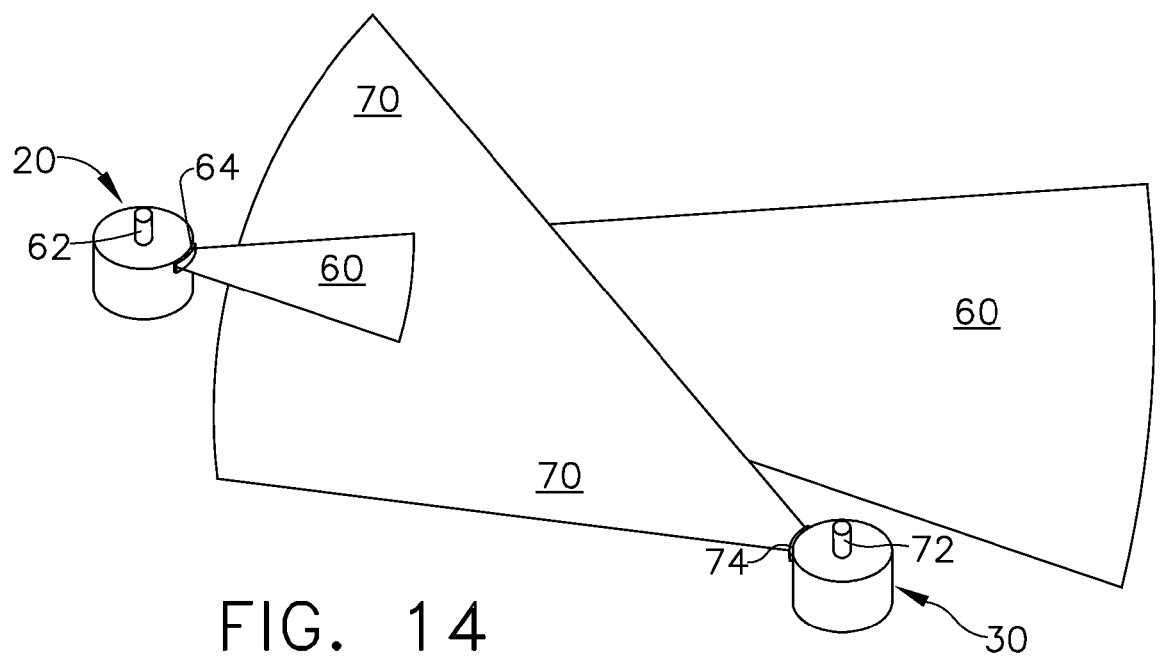
FIGS. 14-19 are diagrammatic views showing how two base units of the system of FIG. 1 can automatically establish an alignment axis therebetween.

Referring now to FIGS. 14-19, an example of a methodology for establishing an alignment axis between two base units is provided. Referring now to FIG. 14, the two base units 20 and 30 are emitting vertical planes of laser light in a fan beam shape, in which the plane of laser light for base unit 20 is designated by the reference numeral 60, and the plane of laser light from base unit 30 is designated by the reference numeral 70. As can be seen in FIG. 14, laser light planes 60 and 70 intersect one another, but they are not aligned, nor do they intersect the opposite base unit.

In FIG. 14, base unit 20 has a positioning photosensor at 64, which typically can be a "butt cell" set of photocells that are precisely aligned to the center of the emitted laser fan beam. Base unit 20 has a second photosensor at 62 that comprises a photocell and a cylinder lens. The cylinder lens extends vertically above the top of the base unit structure (this is similar to element 230 on FIG. 8), and the photocell is attached at one end of the cylinder lens (which is similar to the photocell 236 on FIG. 8). This photocell and cylinder lens combination 62 is roughly aligned to the rotation center of base unit 20. (It does not need to be precisely aligned. Photosensor 62 provides "gross" alignment sensing capability for detecting the laser beams of the other laser transmitter, from base unit 30.)

In a similar fashion, base unit 30 also includes a positioning photosensor 74 which typically can be a "butt cell" array of photocells, which are precisely aligned to the center of the emitted laser fan beam 70. (Note: this "precise" alignment could include characterizing the array of photocells to correct for any offset, in case the position of the laser beam output and the photosensor's null point are not perfectly aligned.) Also, base unit 30 includes a cylinder lens and photocell combination at 72, which is roughly (not precisely) aligned to the rotation center of that base unit. Photosensor 72 provides "gross" alignment sensing capability for detecting the laser beams of the other laser transmitter, from base unit 20.

Figure 15:
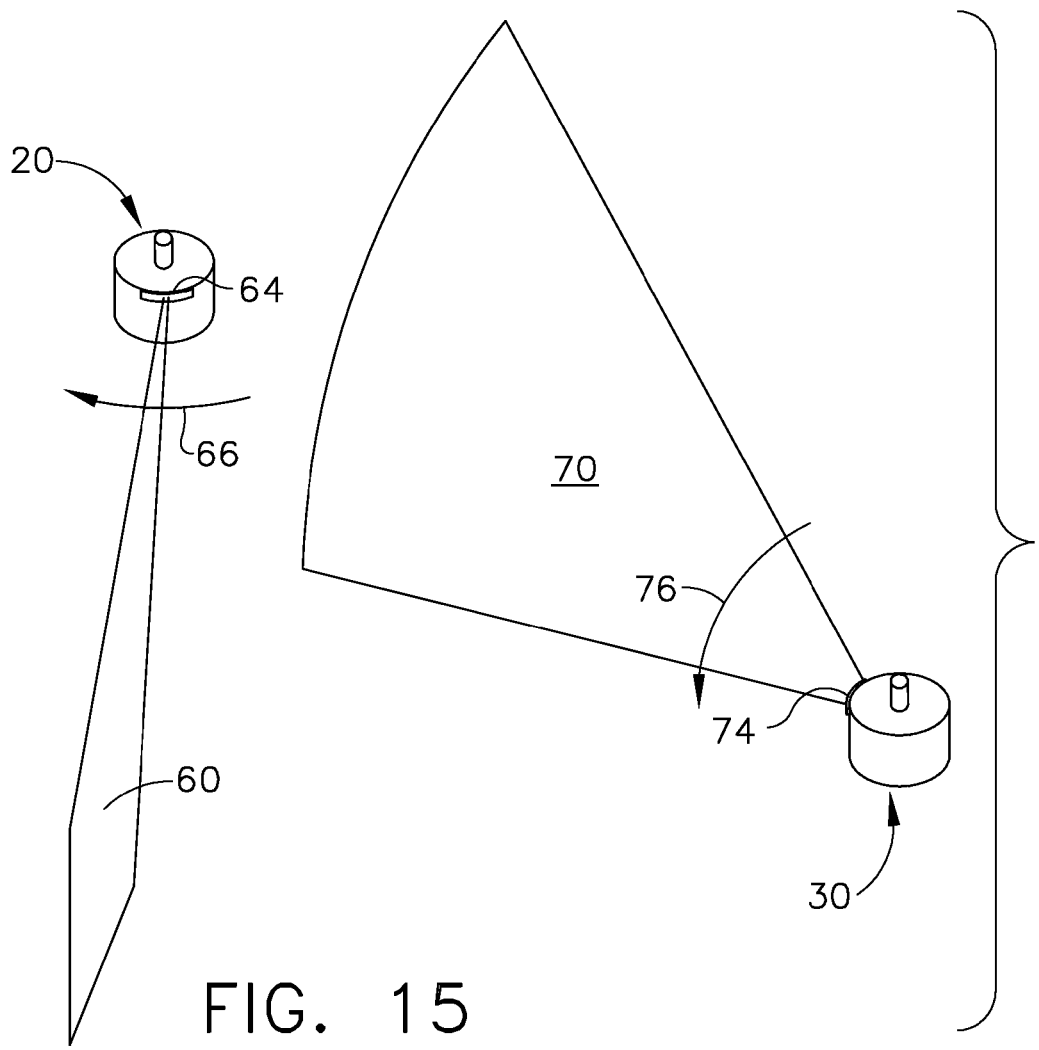

Referring now to FIG. 15, the user has entered a command so that each base unit will begin to rotate. The purpose of this rotation is to have the cylinder lens/photocell combination (either 62 or 72) detect the laser beam from the other base unit. In FIG. 15, it can be seen that both laser fan beams have changed position, but neither fan beam 60 or 70 are intersecting the other base unit. Laser fan beam 60 is rotating in the direction of an angular arc line 66, while base unit 30 has its laser transmitter beam 70 rotating in the direction of an angular line 76.

Figure 16:
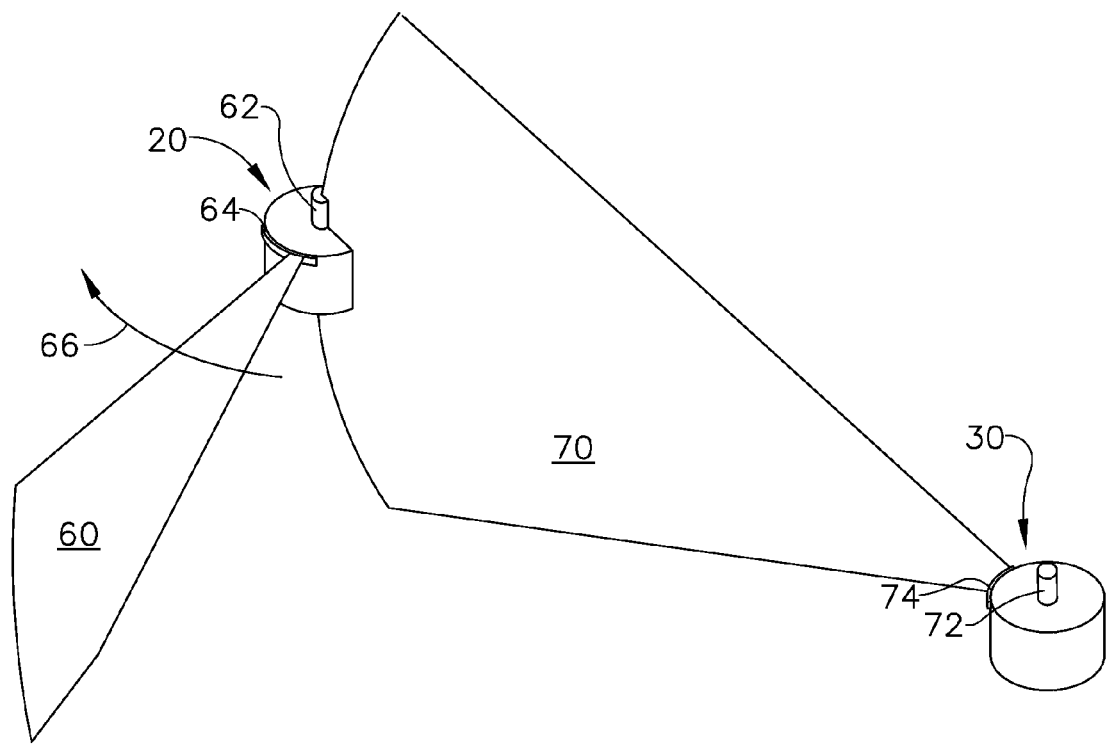
Figure 17:
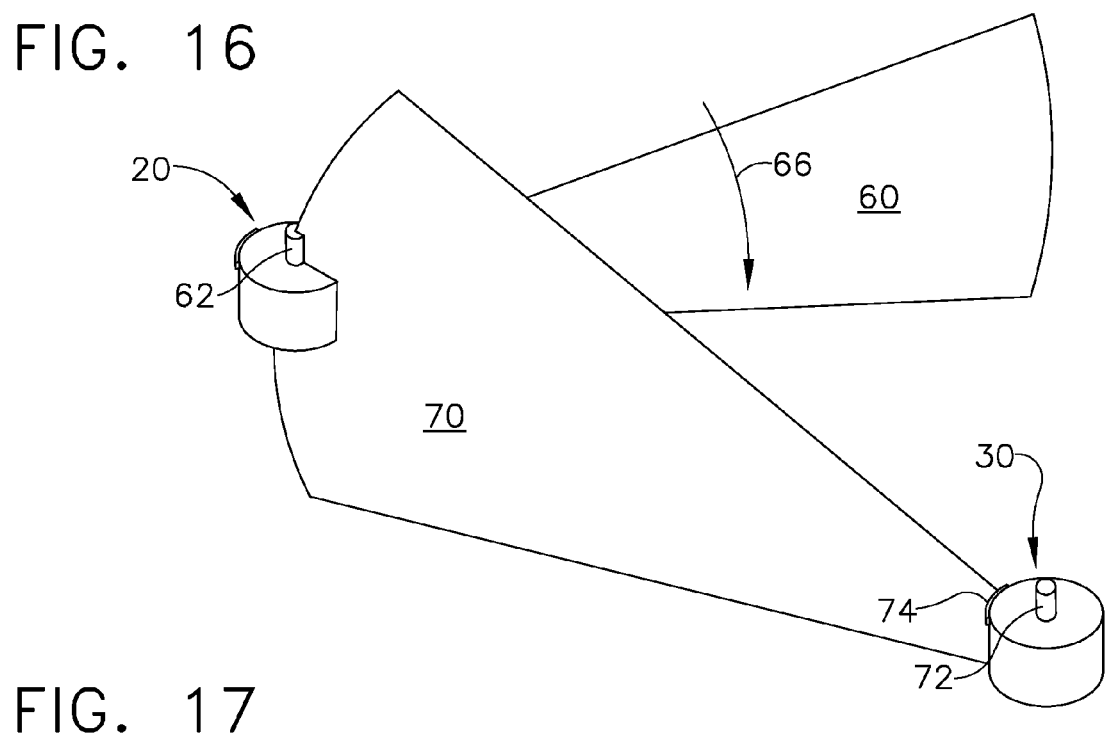

Referring now to FIG. 16, the laser fan beam 70 has intersected the vertical photosensor 62 of base unit 20. When this occurs, base unit 30 can stop rotating its fan beam 70, because it is now roughly in the correct position. However, the fan beam 60 from base unit 20 still needs to continue rotating in the direction 66. In FIG. 17, the fan beam 60 is still rotating from base unit 20, but has not yet intersected base unit 30. The fan beam 70 from to base unit 30 has stopped, and is still intersecting the vertical photosensor 62.

Figure 18:
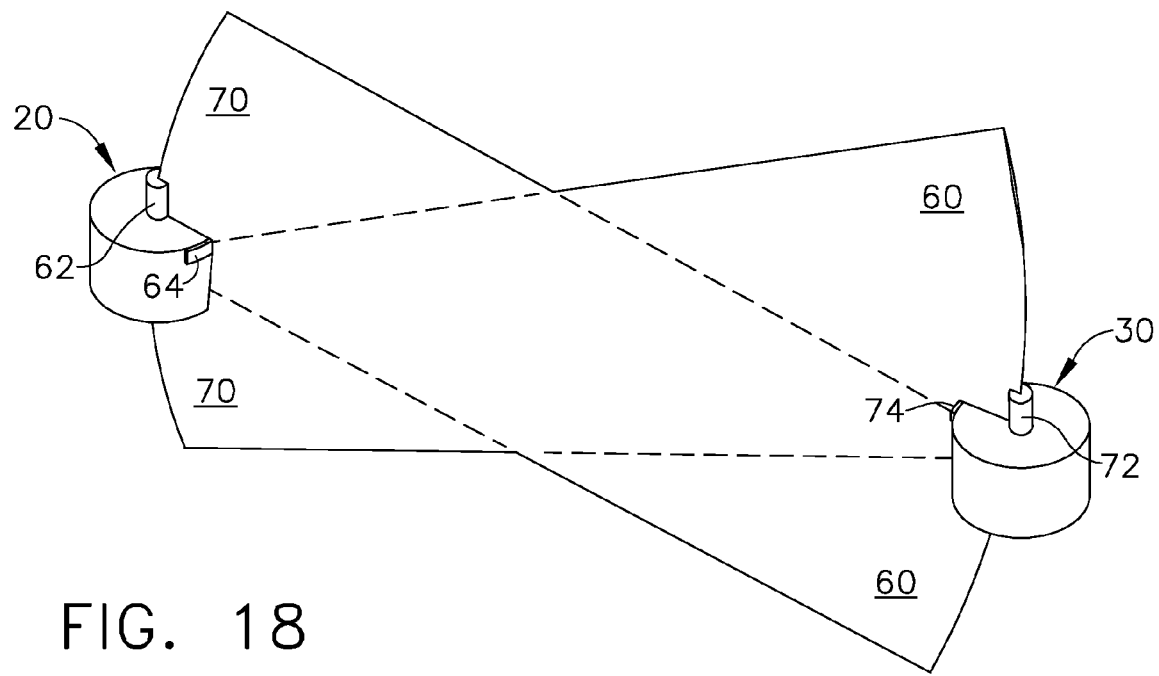

Referring now to FIG. 18, the laser fan beam 60 from base unit 20 has intersected the photosensor 72 of base unit 30, and the laser transmitter at base unit 20 now will stop rotating. At this time, both fan beams 60 and 70 are roughly aligned with the opposite base units 30 and 20 respectively.

Figure 19:
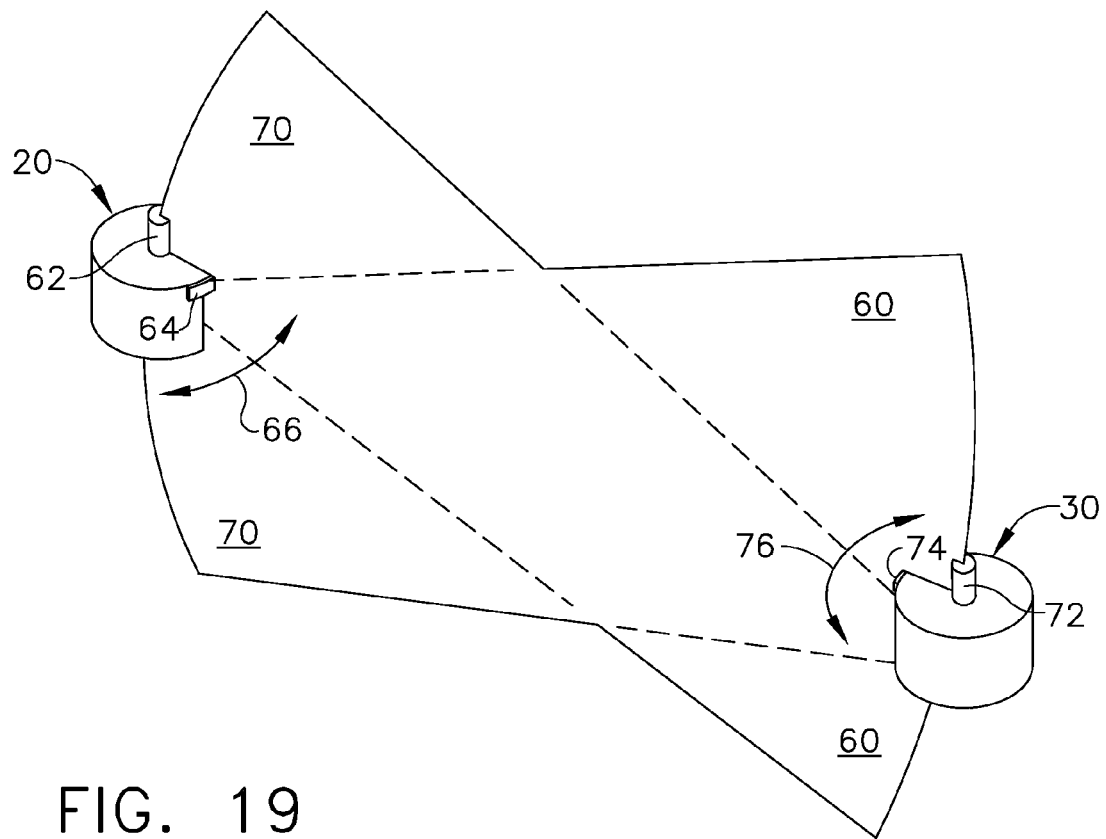

Referring now to FIG. 19, the positioning photocells 64 and 74 now come into play. Assuming these two photocells each comprise a pair of butt cell photosensors, they will have a deadband width between the two photosensitivity areas of the butt cell arrangement, and this deadband width is the desired position that will be sought by the two laser fan beams 60 and 70. Using the positioning photocells 64 and 74, the laser receivers on the two base units 20 and 30 will be able to determine the exact position of the laser strike of the fan beams 60 and 70 within a very small tolerance. The output signals from the laser receivers can be used to command the azimuth positioning motors of both laser transmitters for the base units 20 and 30 to move in small amounts until the vertical edge of the laser planes 60 and 70 are striking the butt cell deadband positions.

The butt cell deadband width can be made quite small, perhaps as small as 0.005 inches, if desired. In FIG. 19, the two laser transmitters are rotated iteratively until each of their fan beams are striking within the deadband width of the butt cells on the opposite base unit. This will now provide a very precise alignment axis between the two base units 20 and 30.

Figure 20:
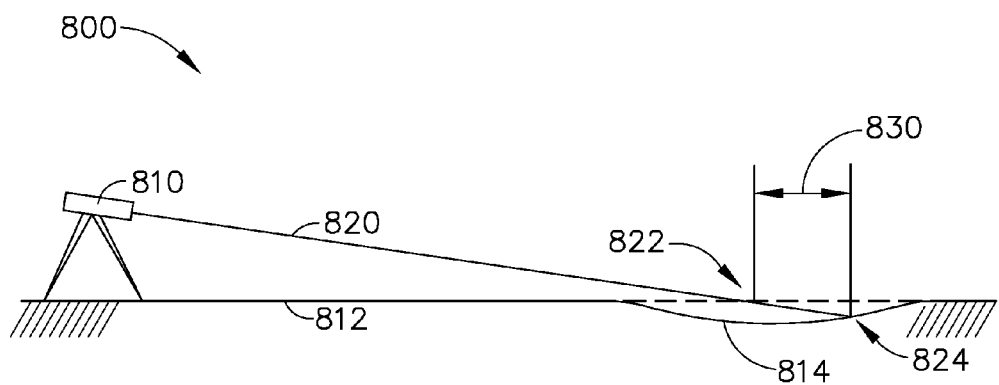
FIG. 20 is an elevational view of a conventional laser position pointing system that is known in the prior art, depicting its attempt to project a position of a point of interest on an uneven jobsite floor.
Figure 21:
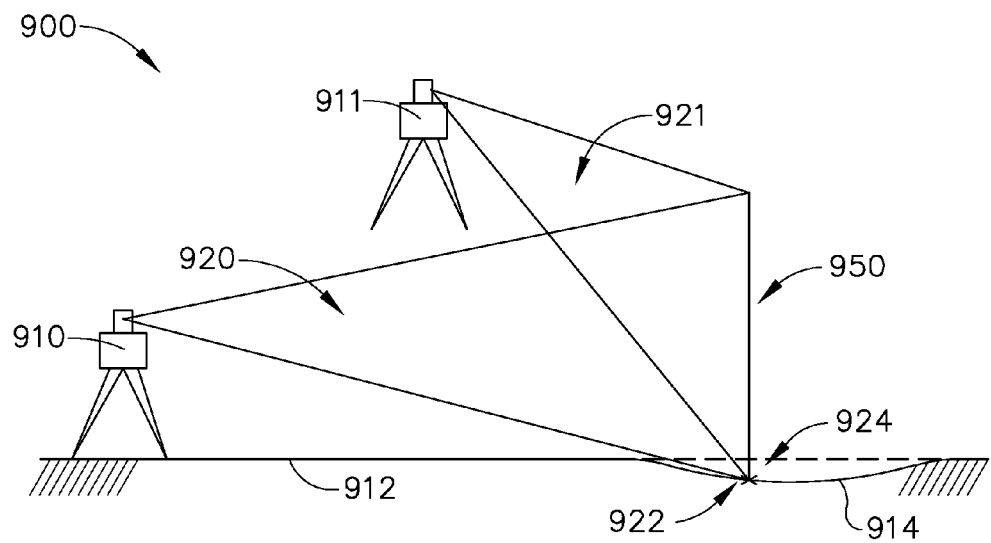
FIG. 21 is an elevational view of the system of FIG. 1, showing two base units with laser transmitters that correctly project a position of a point of interest on an uneven jobsite floor.

Another benefit of the technology disclosed herein is illustrated on FIGS. 20 and 21. FIG. 20 illustrates a conventional (prior art) laser pointing system that is currently used for floor layout procedures. This prior art system is generally designated by the reference numeral 800, and it includes a laser transmitter 810 that is mounted on a tripod, and this assembly is placed on a floor surface 812. This pointing laser system is designed to literally point its laser beam 820 directly at a particular spot on the floor surface 812, and that spot visually designates the point of interest for the user. This system will work, so long as the floor surface is actually flat and horizontal within the tolerance required for the laser pointer system to successfully designate the point of interest.

However, if there is any kind of unevenness in the floor, such as a depression that is designated by the reference numeral 814, then the accuracy of laser pointing system to 800 is completely thrown off. It will be understood that the depression 814 could just as easily be a protrusion in the floor surface, and that would also negatively impact the accuracy of the system 800.

The reference numeral 822 designates the true position for the point of interest on the floor surface where laser beam 820 is attempting to designate that position. However, because of the depression in the floor at 814, the projected point on this uneven surface is at a different physical location in the horizontal direction, which is designated by the reference numeral 824. This causes a position error that is designated by the reference numeral 830. Depending upon the horizontal distance between the true position 822 and the position of the laser transmitter 810, the position error 830 can be significant, and will render the system useless for its intended accuracy.

Referring now to FIG. 21, the technology disclosed herein can be used with two laser transmitters, as described above, and this type of system is generally designated by the reference numeral 900. A first laser transmitter is at 910, and a second laser transmitter is at 911. Laser transmitters 910 and 911 are both mounted on tripods, and both emit a laser fan beam (in this example), in which the fan beam for laser transmitter 910 is designated by the reference numeral 920, and the fan beam for laser transmitter 911 is designated by the reference numeral 921.

Both laser transmitters are positioned on a floor surface, which is generally designated by the reference numeral 912. A point of interest is entered into the system that controls the azimuth of both laser transmitters 910 and 911, and therefore, they will be aimed at the correct location on the floor surface. On FIG. 21, the true position of the point of interest is designated by the reference numeral 922. It so happens that the point of interest 922 lies in a depression in the floor, which is designated by the reference numeral 914. However, the vertical planes of the two laser fan beams 920 and 921 intersect in a vertical plumb line at 950, and this plumb line will run from its uppermost limit at the top edge of the laser fan beams 920 and 921 down to its lowermost limit (along line 950), which intersects the floor surface in the depression 914, at a point 924.

Because of the way system 900 operates to create the plumb line 950, the indicated position of the point of interest at 924 will fall exactly at the true position of the point of interest at 922. Therefore, no error will occur between the true position 922 and the to point that is projected onto the floor surface 924, even when that projected point falls within a depression, such as the depression 914. This will also be true if, instead of a depression, there is a protrusion in the floor surface. This feature is a very significant advantage provided by the technology disclosed herein.

It will be understood that some of the logical operations described in relation to the flow charts of FIGS. 5-7 can be implemented in electronic equipment using sequential logic (such as by using microprocessor technology), or using a logic state machine, or perhaps by discrete logic; it even could be implemented using parallel processors. One preferred embodiment may use a microprocessor or microcontroller (e.g., one of the microprocessor 110, 210, or 310) to execute software instructions that are stored in memory cells within an ASIC. In fact, the one entire microprocessor (or a microcontroller, for that matter), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the point coordinates data stored, for example, in memory elements 312 or 316), or perhaps by a type of memory device not yet invented.

It will also be understood that the precise logical operations depicted in the flow charts of FIGS. 5-7, and discussed above, could be somewhat modified to perform similar, although not exact, functions without departing from the principles of the technology disclosed herein. The exact nature of some of the decision steps and other commands in these flow charts are directed toward specific future models of laser transmitter and receiver systems, and floor layout portable computers (those involving Trimble Navigation laser and floor layout equipment, for example) and certainly similar, but somewhat different, steps would be taken for use with other models or brands of laser equipment and floor layout computer systems in many instances, with the overall inventive results being the same.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; or a vertical wall structure could be positioned at or near a specific point on a horizontal floor or ceiling surface; such a relationship could be termed "proximal." Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary to skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A method for setting up a layout and point transfer system, said method comprising:

(a) providing a first base unit which includes a first laser light transmitter that emits a first laser light plane;

(b) providing a second base unit which includes a second laser light transmitter that emits a second laser light plane;

(c) positioning said first base unit and said second base unit at two different locations on a solid surface of a jobsite;

(d) providing a remote unit for use on said jobsite;

(e) determining an alignment axis between said first base unit and said second base unit;

(f) aiming said first laser light transmitter at a first static direction and said second laser light transmitter at a second static direction so that a first benchmark point is indicated by intersecting laser light lines along said solid surface, which are produced by said first and second laser light planes; and determining a first set of azimuth angles of said first and second laser light transmitters;

(g) aiming said first laser light transmitter and said second laser light transmitter so that a second benchmark point is indicated by intersecting laser light lines along said solid surface, which are produced by said first and second laser light planes; and determining a second set of azimuth angles of said first and second laser light transmitters;

(h) by use of said first and second sets of azimuth angles, determining positions of said first and second base units with respect to said first and second benchmark points; and (i) by use of said remote unit, storing: (A) said first set of azimuth angles of said first and second laser light transmitters, (B) said second set of azimuth angles of said first and second laser light transmitters, and (C) said determined positions of said first and second base units with respect to said first and second benchmark points.

2. The method of claim 1, wherein a user is able to visibly see said intersecting static laser light planes at said first benchmark point and at said second benchmark point.

3. The method of claim 1, wherein said step of determining an alignment axis between said first and second base units comprises one of: (a) aiming said first laser light transmitter at a second reflector mounted to said second base unit, and aiming said second laser light transmitter at a first reflector mounted to said first base unit, thereby manually establishing said alignment axis; and (b) aiming said first laser light transmitter at a second null-position laser receiver mounted on said second base unit, and aiming said second laser light transmitter at a first null-position laser receiver mounted on said first base unit, and sending signals from said first and second laser receivers to a remote unit to command said first and second laser light transmitters to individually slew their azimuth aiming positions until reaching a null position for the opposite laser receiver, thereby automatically establishing said alignment axis.

4. The method of claim 1, wherein said steps of determining said first and second sets of azimuth angles comprises one of: (a) manually reading a first optical angle scale mounted on said first base unit, and manually reading a second optical angle scale mounted on said second base unit; and (b) automatically reading a first signal from a first angle encoder mounted on said first base unit, and automatically reading a second signal from a second angle encoder mounted on said second base unit.

5. The method of claim 1, wherein: said first base unit and said second base unit are not moved from said two different locations on said solid surface of a jobsite during said method.

6. The method of claim 1, wherein said remote unit comprises: a processing circuit, a memory circuit, a data entry circuit, and a display.

7. The method of claim 1, further comprising the step of: initiating a virtual jobsite floor plan, using said angle and position data that was stored in said remote unit.

8. The method of claim 7, further comprising the step of: displaying said virtual jobsite floor plan on a display screen of said remote unit.

9. A method for setting up a layout and point transfer system, said method comprising:

(a) providing a first base unit which includes a first laser light transmitter that emits a first laser light plane;

(b) providing a second base unit which includes a second laser light transmitter that emits a second laser light plane;

(c) positioning said first base unit and said second base unit at two different locations on a solid surface of a jobsite;

(d) providing a portable computer for use on said jobsite;

(e) determining an alignment axis between said first base unit and said second base unit;

(f) aiming said first laser light transmitter at a first static direction and said second laser light transmitter at a second static direction so that a first benchmark point is indicated by intersecting laser light lines along said solid surface, which are produced by said first and second laser light planes; and determining a first set of azimuth angles of said first and second laser light transmitters;

(g) aiming said first laser light transmitter and said second laser light transmitter so that a second benchmark point is indicated by intersecting laser light lines along said solid surface, which are produced by said first and second laser light planes; and determining a second set of azimuth angles of said first and second laser light transmitters;

(h) by use of said first and second sets of azimuth angles, determining positions of said first and second base units with respect to said first and second benchmark points; and (i) by use of said portable computer, storing: (A) said first set of azimuth angles of said first and second laser light transmitters, (B) said second set of azimuth angles of said first and second laser light transmitters, and (C) said determined positions of said first and second base units with respect to said first and second benchmark points.

10. The method of claim 9, wherein a user is able to visibly see said intersecting static laser light planes at said first benchmark point and at said second benchmark point.

11. The method of claim 9, wherein said step of determining an alignment axis between said first and second base units comprises one of: (a) aiming said first laser light transmitter at a second reflector mounted to said second base unit, and aiming said second laser light transmitter at a first reflector mounted to said first base unit, thereby manually establishing said alignment axis; and (b) aiming said first laser light transmitter at a second null-position laser receiver mounted on said second base unit, and aiming said second laser light transmitter at a first null-position laser receiver mounted on said first base unit, and sending signals from said first and second laser receivers to a portable computer to command said first and second laser light transmitters to individually slew their azimuth aiming positions until reaching a null position for the opposite laser receiver, thereby automatically establishing said alignment axis.

12. The method of claim 9, wherein said steps of determining said first and second sets of azimuth angles comprises one of: (a) manually reading a first optical angle scale mounted on said first base unit, and manually reading a second optical angle scale mounted on said second base unit; and (b) automatically reading a first signal from a first angle encoder mounted on said first base unit, and automatically reading a second signal from a second angle encoder mounted on said second base unit.

13. The method of claim 9, wherein: said first base unit and said second base unit are not moved from said two different locations on said solid surface of a jobsite during said method.

14. The method of claim 9, wherein said portable computer comprises: a processing circuit, a memory circuit, a data entry circuit, and a display.

15. The method of claim 9, further comprising the step of: initiating a virtual jobsite floor plan, using said angle and position data that was stored in said portable computer.

16. The method of claim 15, further comprising the step of: displaying said virtual jobsite floor plan on a display screen of said portable computer.

17. A method for setting up a layout and point transfer system, said method comprising:
  (a) positioning a first base unit and a second base unit at two different locations on a solid surface of a jobsite, said first base unit having a first laser light transmitter that emits a first laser light plane, said second base unit having a second laser light transmitter that emits a second laser light plane;
  (b) using a remote unit on said jobsite, said remote unit having a processing circuit and a memory circuit;
  (c) determining an alignment axis between said first base unit and said second base unit;
  (d) aiming said first laser light transmitter at a first static direction and said second laser light transmitter at a second static direction so that a first benchmark point is indicated by intersecting laser light lines along said solid surface, which are produced by said first and second laser light planes; and determining a first set of azimuth angles of said first and second laser light transmitters;
  (e) aiming said first laser light transmitter and said second laser light transmitter so that a second benchmark point is indicated by intersecting laser light lines along said solid surface, which are produced by said first and second laser light planes; and determining a second set of azimuth angles of said first and second laser light transmitters;
  (f) by use of said first and second sets of azimuth angles, determining positions of said first and second base units with respect to said first and second benchmark points; and
  (g) by use of said remote unit, storing: (i) said first set of azimuth angles of said first and second laser light transmitters, (ii) said second set of azimuth angles of said first and second laser light transmitters, and (iii) said determined positions of said first and second base units with respect to said first and second benchmark points.

18. The method of claim 17, wherein a user is able to visibly see said intersecting static laser light planes at said first benchmark point and at said second benchmark point.

19. The method of claim 17, further comprising the step of: initiating a virtual jobsite floor plan, using said angle and position data that was stored in said remote unit.

20. The method of claim 17, further comprising the step of: displaying said virtual jobsite floor plan on a display screen of said remote unit.

* * * * *